United States Patent [19]

Giallanza et al.

[11] 4,369,443
[45] Jan. 18, 1983

[54] MESSAGE COMMUNICATION SYSTEM WITH MESSAGE STORAGE

[75] Inventors: Frank V. Giallanza, San Jose; Don M. Tracey, Mountain View; Wayne T. Holcombe, Palo Alto, all of Calif.

[73] Assignee: Meta Systems, Inc., Sunnyvale, Calif.

[21] Appl. No.: 106,713

[22] Filed: Dec. 26, 1979

[51] Int. Cl.³ .............................................. G08B 5/22
[52] U.S. Cl. ........................ 340/825.47; 340/825.44; 371/49; 455/31; 455/38; 455/70
[58] Field of Search ............ 340/311, 168 R, 168 B, 340/171 R, 825.44, 825.45, 825.47, 825.71, 825.72; 455/38, 31, 32, 68, 70; 371/49–51, 58; 179/2 EC

[56] References Cited

U.S. PATENT DOCUMENTS

| | | | |
|---|---|---|---|
| 3,772,596 | 11/1973 | Edwards | 455/38 |
| 4,069,477 | 1/1978 | Maben | 340/311 |
| 4,110,743 | 8/1978 | Zahnd | 340/167 R |
| 4,181,893 | 1/1980 | Ehmke | 340/311 |

Primary Examiner—James J. Groody
Attorney, Agent, or Firm—Fitch, Even, Tabin, Flannery & Welsh

[57] ABSTRACT

A transmission system develops a binary encoded data train having a message and a header preceding the message. The data train is applied to a carrier frequency to modulate the carrier using FSK techniques. The header includes synch signals, one or more address signals, a message length signal and control signals separating the above signals. One or more personal receivers receive the message if responsive to one of the address signals in the header. An address signal may address a unique personal receiver, a selected group of or all such personal receivers. Each receiver is sequentially activated and deactivated, being activated to detect a synch signal. If synch signals are detected, the receiver remains activated to determine if an address signal identifies such receiver to receive the message. A received message is stored digitally and may be selectively displayed in alphanumeric characters when convenient for the recipient.

51 Claims, 10 Drawing Figures

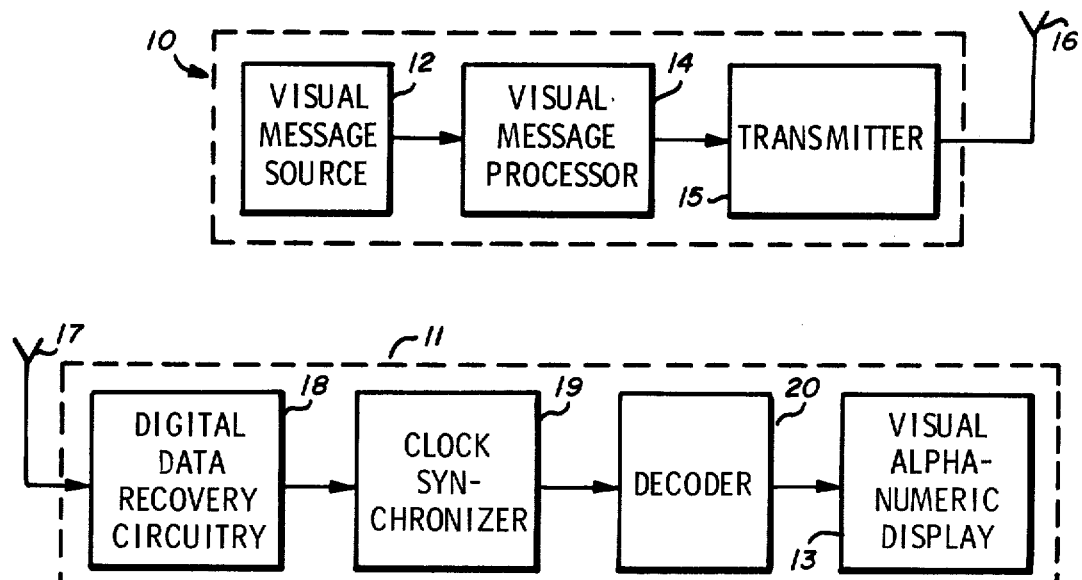
Fig_1
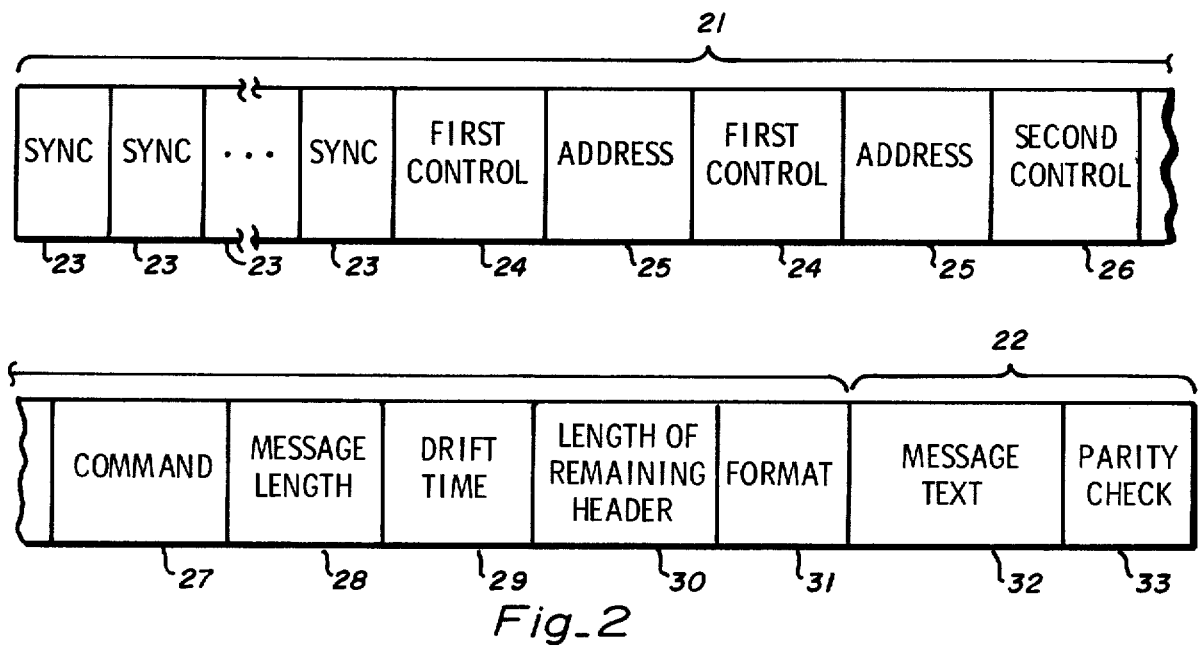
Fig_2
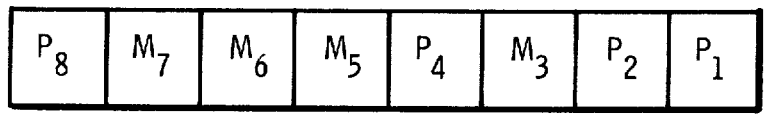
Fig_2a
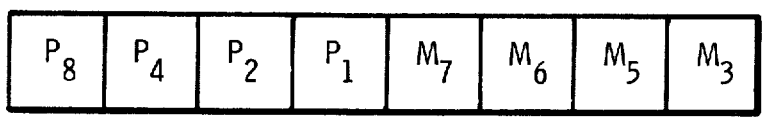
Fig_2b

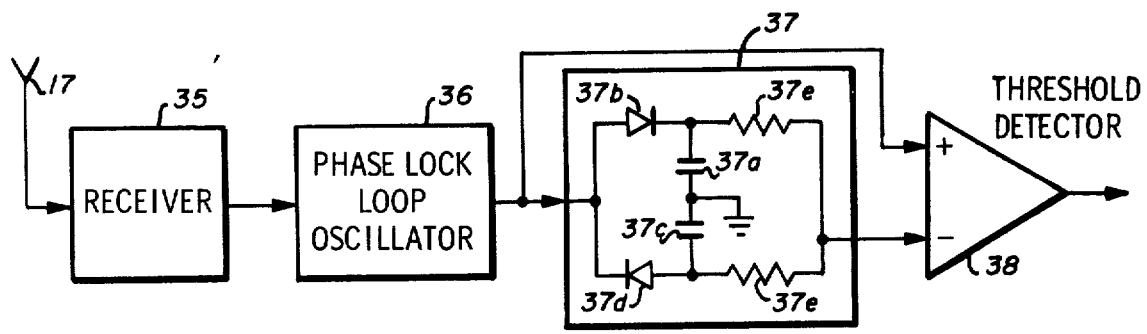
Fig_3
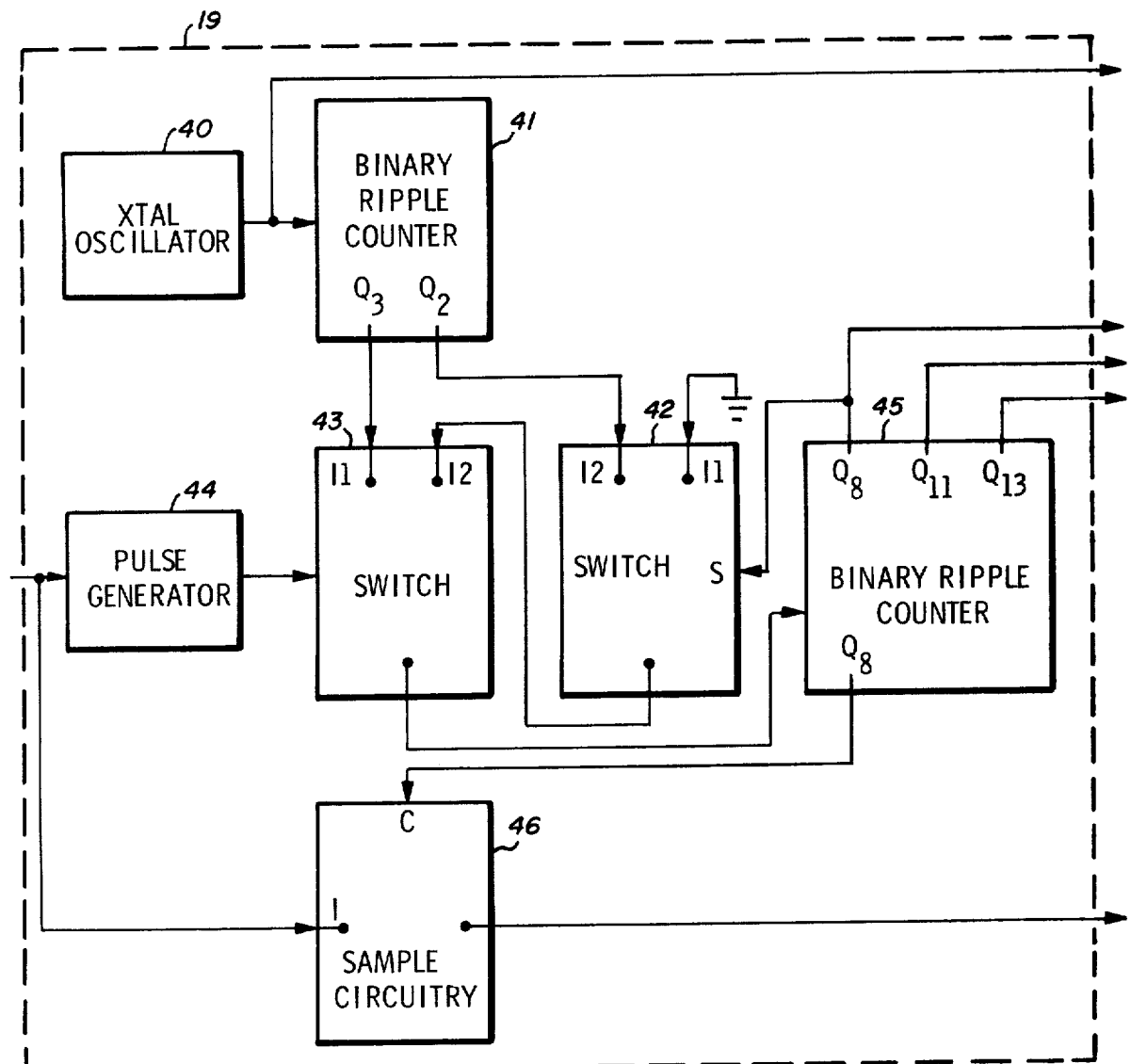
Fig_4

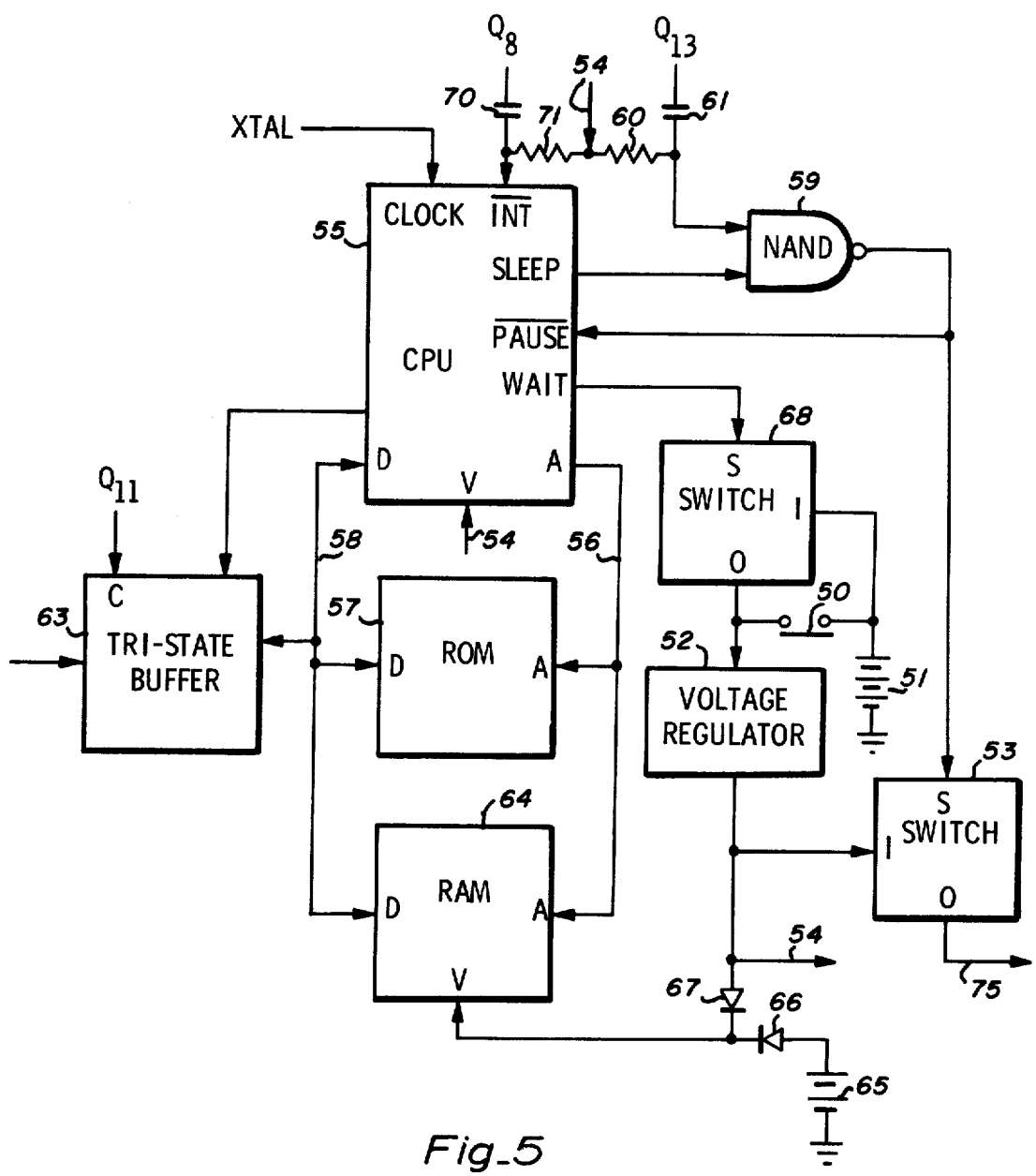
Fig_5

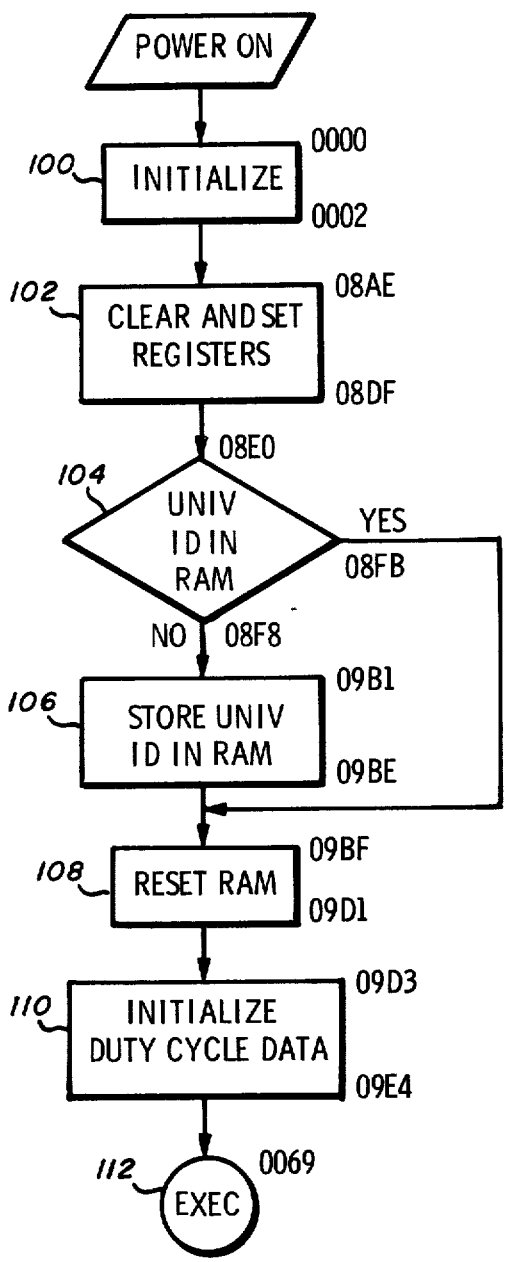
Fig_6

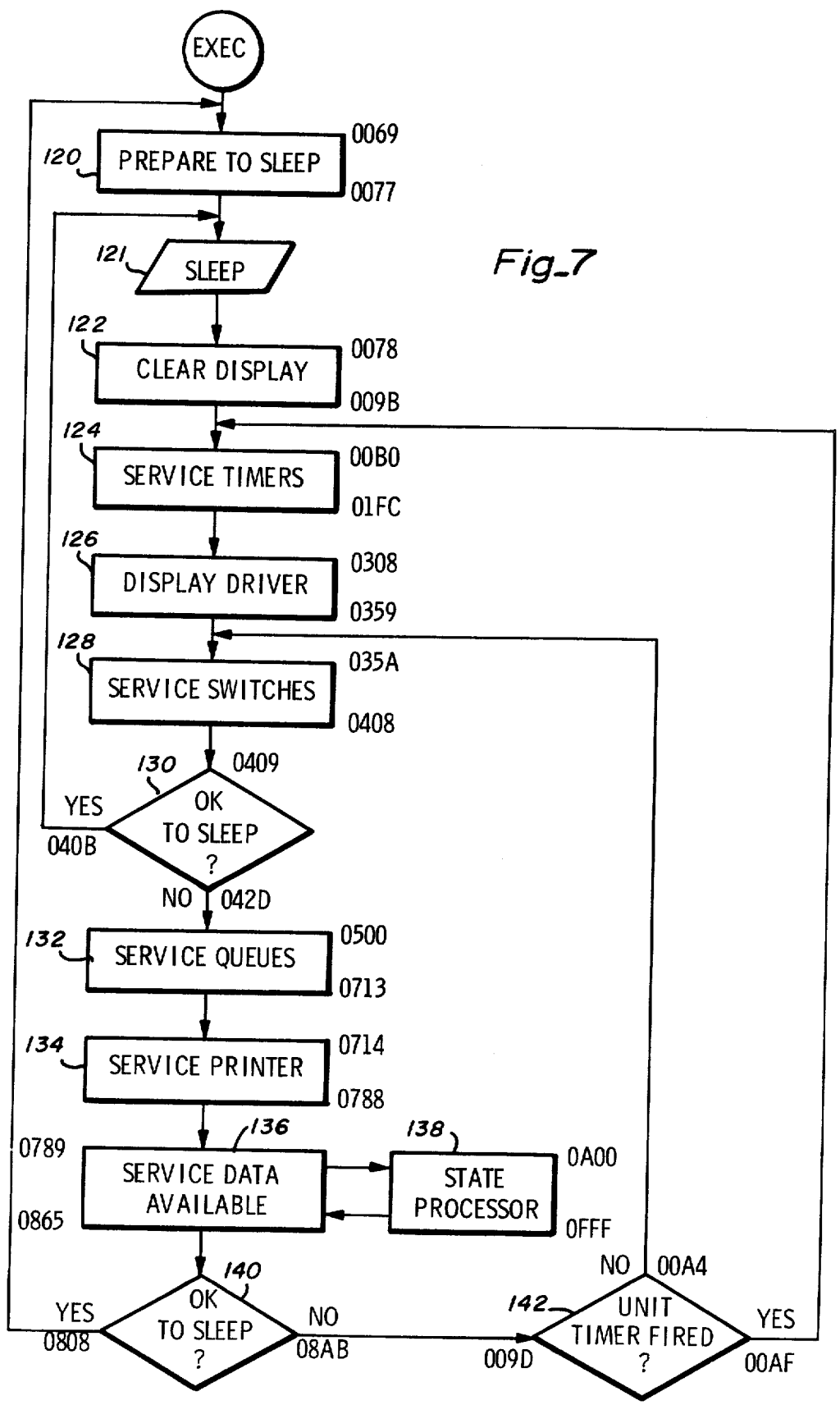
Fig_7

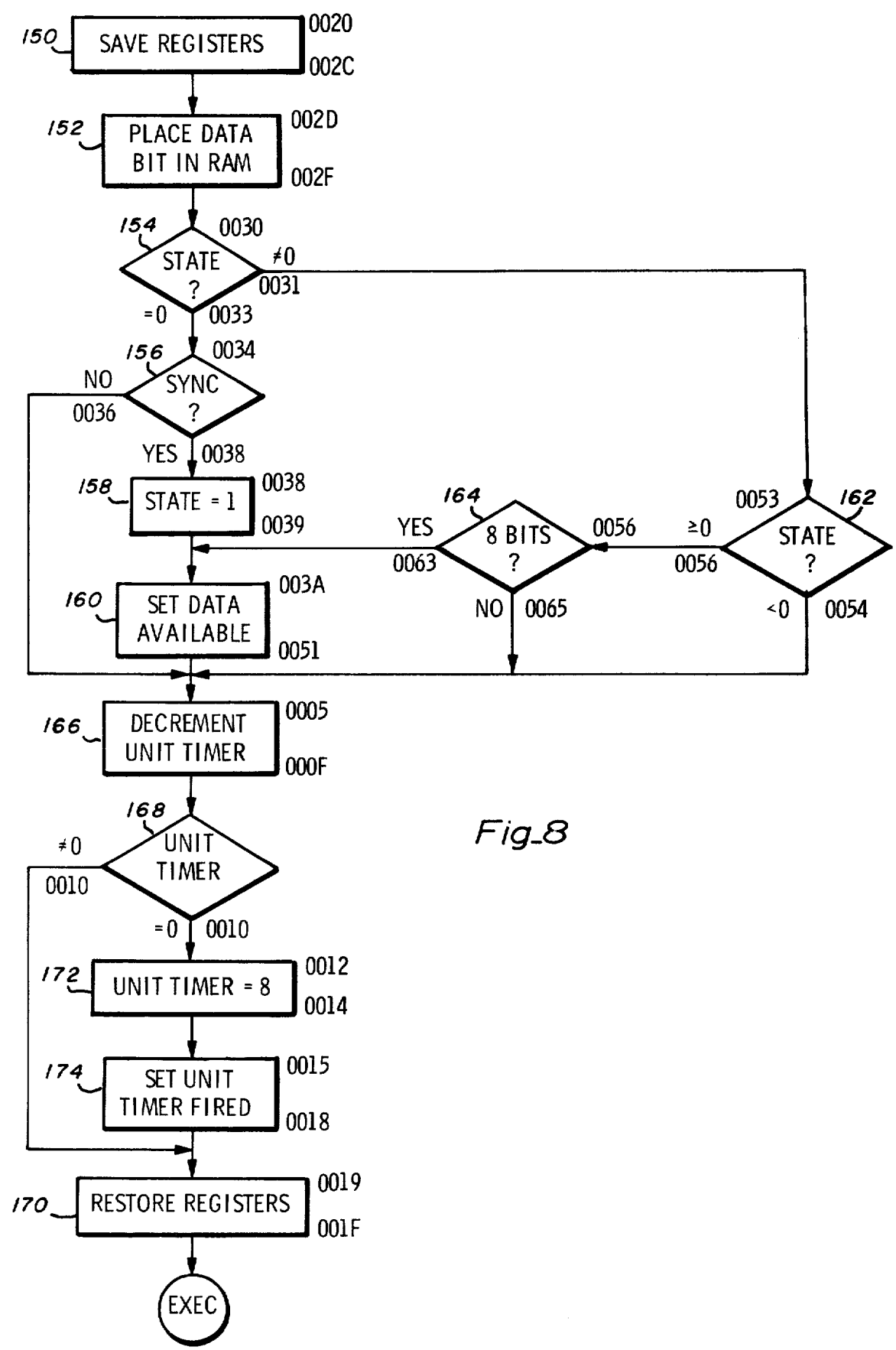
Fig_8

MESSAGE COMMUNICATION SYSTEM WITH MESSAGE STORAGE

BACKGROUND OF THE INVENTION

The present invention relates generally to message communication and more particularly describes novel apparatus and techniques for reliably conveying messages to individuals or groups of individuals.

It is often desirable to reach individuals without disturbing them when a transmitted message is received, while also allowing such individuals to view the message at their convenience.

Heretofore, paging systems have generally been designed to reach a selected person who is made aware of the page by a beeper sound or the like upon which the paged person goes to the nearest telephone and calls the originator of the paging signal for the message. Another type of paging system has the ability to receive the message, providing the recipient with a paging signal, and a voice message. A person carrying a paging system of either type may not wish to be disturbed, such as an attorney during court proceedings, and such person will turn off the paging device which loses the ability to inform the person that a message is intended for him. A person using the second type of paging system may be unable to understand the voice message in a noisy environment or unable to make notes of the voice message such as when operating a motor vehicle. If the person desires to review the voice message, he must telephone the originator of the message.

With another type of prior art system, the person is provided with a paging system that has the ability to receive the message and retain it as hard copy. Such a system is described in U.S. Pat. No. 3,846,783 which issued on Nov. 5, 1974. However, even that system lacked the ability to store messages in digitally encoded form so that the message may be reproduced whenever the recipient desires. Said system also lacked the ability to: warn the intended recipient when the receiver is out of range of the transmitting antenna, provide each receiver with a plurality of addresses, remotely add or delete addresses from the personal receiver, remotely turn off the personal receiver when no messages are transmitted, predetermine the character count of the transmitted message avoiding the possibility of a lost end of message character in transmission, and synchronize the personal receiver with the data stream without the parallel transmission of clock information.

Accordingly, it is an important object of the present invention to provide a receiver that is light, compact and reliable enough to be carried by individuals.

It is a further object of the present invention to provide a first address uniquely identifying each receiver.

It is a further object of the present invention to provide a further address identifying a common group of receivers.

It is yet a further object of the present invention to provide a common address identifying all receivers.

It is yet a further object of the present invention to remotely add or delete or modify any address of the personal receiver.

It is still a further object of the present invention to store the message until the recipient is able to conveniently review the message on a visual display.

It is yet another further object of the present invention to allow the recipient to selectively view, retain, or delete messages stored in the personal receiver.

It is a further object of the present invention to warn the recipient when the receiver is out of range of a transmitting antenna.

It is a further object of the present invention to combine sequentially repeated transmission of the same message while storing the maximum number of error-free characters of the single message.

SUMMARY OF THE PRESENT INVENTION

According to the invention, a binary encoded data train is developed and transmitted, wherein the data train has a message portion and a header preceeding the message portion. The header signals include a plurality of sync signals, a first control signal marking the end of the sync signals, at least a first address signal, the first control signal also marking the beginning of each address signal in the event the header includes a plurality of address signals, a second control signal to mark the end of all address signals, and a message length signal which contains information of the total character count of the message portion.

A personal receiver includes synch means for preparing the personal receiver for reception of the data train and an address means responsive to the address signal. The address means includes a first address means responsive to a universal address signal common to all of the personal receivers, second address means responsive to an individual address signal uniquely identifying the personal receiver and a third address means responsive to a selected address signal common to a selected group of personal receivers. In an addressed personal receiver, the message means receives and stores the message portion and selectively displays the message portion in alphanumeric characters.

Numerous other features, objects and advantages of the present invention will become apparent from the following specification when read in connection with the accompanying drawings.

BRIEF DESCRIPTION OF THE DRAWINGS

FIG. 1 is a block diagram illustrating the transmitting system and the receiving system;

FIG. 2 is a formatting diagram of the header signals and the message signals as transmitted and received;

FIG. 2a is a possible format of one of the signals contained in said header signals of FIG. 2;

FIG. 2b is a variation of FIG. 2a illustrating the preferred format of one of the header signals;

FIG. 3 is a block diagram illustrating the digital data recovery system of the receiving system of FIG. 1;

FIG. 4 is a block diagram illustrating the clock synchronization system of the receiving system of FIG. 1;

FIG. 5 is a block diagram illustrating the decoder of the receiving system of FIG. 1;

FIG. 6 is a flow diagram of the program and operation of the decoder in the receiver of FIG. 5 illustrating the initialization routine;

FIG. 7 is a flow diagram of the program and operation of the decoder in the receiver shown in FIG. 5 illustrating the executive routine;

FIG. 8 is a flow diagram of the program and operation of the decoder of the receiver shown in FIG. 5 illustrating the interrupt service routine.

DETAILED DESCRIPTION OF THE DRAWINGS

FIG. 1 shows a block diagram illustrating the overall message communication system comprising a message transmission system 10 and a personal receiver 11. The system also illustrates the manner in which a message entered at visual message source 12 is viewed on a visual alphanumeric display 13 built into the personal receiver 11 carried by the intended recipient or plurality of recipients. Visual message source 12 encodes the message into a series of binary logic levels and applies the message in the digitally encoded form to visual message processor 14, which then converts the digital data into a corresponding sequence of audio tones for modulating transmitter 15, preferably by frequency modulation, to radiate an FM signal from antenna 16.

Receiving antenna 17 receives the transmitted energy and applies it to the digital data recovery circuitry 18 which includes the usual circuits for detecting the modulation and reconverting the audio tones into the corresponding sequence of binary logic levels. The recovered digital data is then applied to the clock synchronizer 19 which synchronizes the internal clocks of personal receiver 11 to the incoming data stream so that each of the binary data bits can be properly sampled and applied to decoder 20 which stores the message prior to display of said message on the visual alphanumeric display 13.

The visual message source 12 may be a standard keyboard terminal such as the Lear Siegler Inc., Model ADM-3A Dumb Terminal which converts alphanumeric characters to an electrical signal such as the ASCII code which is well known in the art. Each character of the ASCII code contains one start bit, seven information bits, one parity bit, and two stop bits, and the decoder 20 is selected to decode ASCII characters. The visual message source 12 of course need not be the above described terminal but may be any means of converting alphanumeric characters into a selected code with a suitable decoder 20 being selected to decode the same.

The visual message processor 14 accepts the digital data from the visual message source 12 and in the usual manner will convert the digitally encoded information into a series of analog audio tones. It is necessary for the proper operation of the digital data recovery circuitry 18 and the clock synchronizer 19 that the audio tone which corresponds to the high binary logic level be set at 1.5 times the frequency of the audio tone which corresponds to the low binary logic level. It is also necessary in the utilization of the invention that the data train bit rate generated by the visual message processor 14 be identical to the frequency of the audio tone used to encode the low binary logic level. In the preferred embodiment of the invention the high binary logic level is chosen to have a corresponding audio tone of 1800 Hz and the low binary logic level to have a corresponding audio tone of 1200 Hz. The data train containing these audio tones is then applied to transmitter 15 at a rate of 1200 bit/sec. Of course any audio frequencies can be chosen providing that the above mathematical criteria are met.

The data train which now consists of a series of audio tones, is modulated onto a carrier frequency utilizing the usual method of frequency modulation. The frequency modulated RF signal is then applied to antenna 16 for transmission to the personal receiver 11.

The above described system explains a method whereby a message may be transmitted to a single personal receiver 11. In order to expand the system of FIG. 1, so that one or more of a plurality of personal receivers 11 may be addressed, or for other reasons which will become better understood hereinafter, it is necessary that a header be applied preceeding the message generated by visual message source 12. Commercially available data processing and time sharing computer networks, such as Time Share, Inc., may be utilized so that the visual message source 12 will apply its output of binary logic levels to this commercially available system (not shown). The subscriber to this commercially available system must supply the necessary format of the hereinafter described header in order that the commercially available system can be programmed to produce the said header. The header as generated by the commercially available system will consist of a series of binary logic levels which are then applied to visual message processor 14 immediately preceeding the message and also converted to a corresponding sequence of audio tones as hereinabove described.

With reference to FIG. 2, there is shown a preferred data train format comprising the message header 21 and the message portion 22. The header 21 comprises a plurality of synch signals 23 for preparing the plurality of personal receivers 11 for reception of the data stream. Each synch signal 23 comprises a plurality of binary logic levels chosen to maximize the number of transitions between the two binary logic levels while also providing information for decoder 20 of FIG. 1 for framing the synch signal 23. In the preferred embodiment of the present invention, each such synch signal 23 comprises eight data bits of information containing a hexadecimal D4 which is a binary 11010100. The requirement for a maximum number of transitions between binary logic levels and framing information is readily provided by this configuration. Preferably, the number of synch signals 23 to be contained in the message header 21 should be sixty or more for reasons which will become clearer when describing the program logic executed by the decoder 20 of FIG. 1, and more particularly when describing the duty cycle of said decoder.

Following the plurality of synch signals 23 is the first control signal 24 which marks the beginning of the hereinafter described address signal 25. The first control signal 24 comprises a plurality of binary logic levels chosen so the data bit pattern does not match the data bit pattern of the synch signal 23. The first control signal 24 is encoded by using one of the plurality of redundant binary codes for data transmission which are well known in the art. The redundant code chosen must be capable of being detected by the decoder 20 of FIG. 1. In the preferred embodiment of the present invention, the first control signal 24 comprises eight binary data bits containing a hexadecimal FF. The four least significant data bits are the information bits that mark the end of the plurality of synch signals 23 whereas the four most significant data bits are the redundancy bits generated by modifying an 8421 weighted hamming code which is well known in the art. The hamming code character is one byte in length, where a byte is equivalent to eight bits. FIG. 2a shows a hamming code character. Each subscripted M represents an information data bit and each subscripted P represents a parity check bit. The parity check bits provide a means for correcting the hamming code character should a single bit error occur in the transmission of the character. The hamming code is modified by separating the four information bits from the four parity check bits, into correcting nibble and an information nibble, where each nibble is equivalent to four bits. FIG. 2b shows the modified hamming code character. The method which the hamming code detects and corrects single bit errors is well known in the art and need not be described further.

In the preferred embodiment of the present invention, all of the signals comprising message header 21, including the synch signal 23, are encoded in the above described modified hamming code. The description of such code as it pertains to be description of the first control signal 24 is equally applicable to each of the remaining signal comprising message header 21.

Following the first control signal 24 is at least one address signal 25 for identifying a unique personal receiver 11 or a selected group of the plurality of personal receivers 11, for which the message portion 22 is intended. Address signal 25 comprises a plurality of binary logic levels whose data bit pattern may not match the bit pattern of the first control signal 24. In the preferred embodiment of the present invention, the address signal 25 comprises eight characters of the modified hamming code from which eight nibbles can be extracted for address signal 25 information, providing in excess of four billion address signals 25. The address signal 25 may address a unique personal receiver 11, or a selected group of the plurality of personal receivers 11, or the entire plurality of personal receivers 11 to receive a single message. It is also possible to transmit a single message to two or more personal receivers which are not members of a selected group of the plurality of personal receivers 11. In this mode of operation different address signals 25 may be stacked in message header 21 separated by any signal which the decoder 20 of FIG. 1 will decode as an address separation signal. It is sufficient that the address separation signal be identical to the first control signal 24. Message header 21 shows a method stacking two address signals 25.

Following the address signal 25 is the second control signal 26 to indicate the end of all said address signals 25. The second control signal 26 comprises a plurality of binary logic levels whose data bit pattern may not match the data bit pattern of the first control signal 24 or any address signal 25. In the preferred embodiment of the present invention, the second control signal 26 comprises two characters of the modified hamming code where each such character is identical to the modified hamming code character of the first control signal 24. It is not necessary that second control signal 26 comprise two characters where each character is identical to the first control signal 24, since any data bit pattern comprising the second control signal 26 may be utilized as long as it meets the above criteria and is capable of being decoded as the second control signal 26 by the decoder 20 of FIG. 1.

Following the second control signal 26 is the command signal 27 for performing one or more selected functions in the selected personal receiver 11. The command signal 27 comprises a plurality of binary logic levels when applied to the decoder 20 of FIG. 1, in the execution of its internal logic, signify the type of the message portion 22 and the instruction set to be executed within the program logic of decoder 20 of FIG. 1. In the preferred embodiment of the present invention, the command signal 27 comprises a modified hamming code character of which the information nibble may contain a hexadecimal 0 to a hexadecimal F. There are in the present embodiment of the invention five separate commands to the decoder 20 of FIG. 1, which are signified by the command signal 27. The first of these commands to said decoder 20 is to execute that portion of its logic that will cause the message portion 22 to appear on the visual alphanumeric display 13 of FIG. 1. The remaining commands direct said decoder 20 to execute the portion of its internal logic that stores the message portion 22 to provide further data for the instruction set contained in said decoder 20.

Following the command signal 27 is the message length signal 28 which includes information of the total character count of the message portion 22 of said data train. The message length signal 28 comprises a plurality of binary logic levels when applied to the decoder 20 of FIG. 1 will cause execution of the internal program logic of said decoder 20 to reserve sufficient memory locations within said decoder 20 to accommodate the total number of characters contained in the message portion 22. The message length signal 28 also utilizes one of the unique binary logic levels contained therein to signify that the message portion 22 is the last such message portion 22 to be received in a data train which comprises a plurality of headers 21 and message portions 22 stacked in a manner where the first header 21 is followed by the first message portion 22 which is immediately followed by the second header 21 which, in turn, is followed by the second message portion 22. This stacking format may be continued until a plurality of data trains have been stacked and the last message portion 22 in the stacked data train contains the end of message stacking information noted above. In the preferred embodiment of the present invention, the message length signal 28 comprises three modified hamming code characters from which three information nibbles can be extracted. The most significant data bit of the first information nibble contains the end of message stacking information described above, such that when this bit is at a high binary logic level, the message portion 22 following in the data train is the last message portion 22 which will be received. The remaining eleven bits of information may contain a hexadecimal 0 to a hexadecimal 7FF which encodes the actual character count of the message portion 22.

Following the message length signal 28 is the drift time signal 29 which includes information of the time remaining until the end of the data train comprising the header 21 and the message portion 22, or the time remaining to the end of a series of repeated data trains, or the time remaing to the end of a series of repeated, stacked data trains. The drift time signal 29 comprises a plurality of binary logic levels when applied to decoder 20 of FIG. 1 will cause execution of the portion of the instruction set that will put the personal receiver 11 into an off condition for a duration of time equal to the information contained in the drift time signal 29 if either the data train is not addressed to the personal receiver 11 receiving such data train; or if the personal receiver 11 receiving such data stream is properly addressed by the address signal 25, then as soon as the message portion 22 is applied to the memory of the decoder 20 of FIG. 1, and such message portion 22 does not contain any errors in transmission, then the decoder 20 will cause execution of the instruction set that will put the personal receiver 11 into the off condition for the time remaining until the end of all repeated transmissions of the data train. Conversely, if the message portion 22 contains errors in transmission, then the decoder 20 will cause the personal receiver to monitor repeated transmission for the length of time given in the drift time signal until the decoder 20 determines that it contains an error-free message portion 22 in its memory. In the preferred embodiment of the present invention, drift time signal comprises three modified hamming code characters from which three information nibbles can be extracted, and may contain information from a hexadecimal 0 to hexadecimal FFF which will correspond to a real time of $26\frac{2}{3}$ ms to 109 s.

Following the drift time signal 29 is the length of remaining header signal 30 for providing information of further signals preceding the start of said message portion 22. The length of remaining header signal 30 comprises a plurality of binary logic levels which applied to the decoder 20 of FIG. 1, will be stored as data information to be processed by the internal instruction set of said decoder 20. In the preferred embodiment of the present invention, the length of remaining header signal 30 comprises a modified hamming code character where the information nibble is set to a hexadecimal 1. However, if additional header signals become desirable, the contents of the length of the remaining header signal 30 will change to one reflecting the additional signals.

Following the length of remaining header signal 30 is the format signal 31 providing for a readout of selected parts of the message portion 22. The format signal 31 comprises a plurality of binary logic levels and in the present embodiment of the invention comprises a modified hamming code character. The four information bits in the character are individually used so that when a binary 1 is contained in one of such data bits, the format associated with that data bit will be displayed preceding the display of the message. The four formats possible in the present invention are displays of date and time of message transmission, identity of the originator of the message, identity of the recipient of the message, and an indication that the message received is of the type signified by the proper command signal 27 which will override the stored memory if available memory is insufficient to store the message. The originator of the message at the visual message source 12 of FIG. 1 has the option of determining if one or more of these four formats will be contained in the message portion 22. If such an option has been exercised, the recipient of the message also has the option if the available format will be displayed prior to the display of the message.

Following the message header 21 is the message portion 22 of the data stream which comprises the message text 32 and the parity check signal 33. The message text 32 comprises a plurality of binary logic levels which are identical to the binary logic levels generated by the visual message source 12 of FIG. 1. The message text 32 may be of the type indicated by the command signal 27.

Following the message text 32 is the parity check signal 33 which comprises a plurality of binary logic levels which are generated by a program logic which performs an overall parity check of the message text 32. An identical program logic is performed by the decoder 20 of FIG. 1 on the received message text 32 and will compare the received parity check signal 33 to the parity check signal internally generated. If the two parity check signals are not identical, then the decoder 20 will execute that portion of its instruction set which will cause the personal receiver 11 to monitor repeated transmissions of the data train to correct the message text 32. If no repeated transmission is forthcoming, then an error warning will be displayed following the display of the message text 32 as received on the visual alphanumeric display 13 of FIG. 1. In the preferred embodiment of the present invention, the parity check signal 33 is a character containing eight binary data bits of information. The most significant of these bits is an even parity check bit of the remaining seven bits of information. These seven least significant bits may contain a hexadecimal 0 to a hexadecimal 7F.

All of the above described signals of FIG. 2 convey information necessary for the execution of the program logic within the decoder 20 of FIG. 1. The program logic will be hereinafter described, and the reason for the data train format illustrated in FIG. 2 will become clearer hereinafter.

Returning now to FIG. 1, it can be seen that the personal receiver 11 contains an antenna 17 which receives the transmitted data stream of the form of a frequency modulated of carrier containing the encoded information. Antenna 17 provides gain to digital data recovery circuitry 18, which includes a receiver of conventional design, detects the modulation of the incoming signal, and reconverts the audio tones into the corresponding sequence of binary logic levels.

FIG. 3 shows a more detailed block diagram of the digital data recovery circuitry 18 of FIG. 1. Receiver 35 demodulates the incoming FM signal by conventional means and applies a series of audio tones at the hereinabove described frequencies to the input of a phase locked loop 36. As the phase locked loop 36 tracks the frequency and phase of the incoming audio tones, an output is generated which is a series of electrical signals that correspond to the inputted audio tones. By choosing the hereinabove described relationship between the audio tones used to encode the two binary logic levels and the transmission rate of the data train, operation of the phase locked loop is facilitated by the phase relationship that exist between successive bits of information as encoded by the audio tones. The internal voltage controlled oscillator of the phase locked loop 36 generates the output signal comprising a series of electrical voltage levels. In the preferred embodiment of the present invention, the phase locked loop 36 may be any commercially available phase locked loop oscillator integrated circuit such as 4046 manufactured by National Semiconductor.

The output of phase locked loop 36 is applied to the signal level averager 37 which comprises a diode-capacitance-resistance network, where such network provides a means for detecting the most negative and the most positive peak voltage of the applied electrical signal. Said means includes a capacitor 37a which stores the highest positive peak voltage occurring when the diode 37b becomes forward biased. Capacitor 37c stores the most negative peak voltage occurring when diode 37d becomes forward biased. Resistors 37e comprise a means for generating the average value of the stored voltage levels when both resistances are equal. The node between the two resistors 37e is at a voltage level which is the average of the stored voltage levels. In the preferred embodiment of the present invention, diode 37b and diode 37d are both commercially available 1N 4148 diodes, the capacitances are 0.1 uf, and the resistances are 330 kohm.

Threshold detector 38 comprises a comparator means where the electrical signal generated by the phase locked loop 36 is compared to the electrical signal generated by the signal level averager 37. Whenever the electrical signal applied from the phase locked loop 36 is at a higher voltage than the electrical signal applied from the signal level averager 37, the threshold detector 38 generates an electrical signal that corresponds to the high binary logic level. Conversely, the low binary logic level is generated when the electrical signal applied from the phase locked loop oscillator is at a lower voltage than the signal applied from the signal level averager 37. The comparator means includes a commercially available differential amplifier, operated with a positive supply voltage equal to the voltage encoding the high binary logic level, and the negative supply voltage tied to ground. A series resistance-capacitance feedback path (not shown) is connected between the output and the non-inverting input of the differential amplifier, and the electrical signal generated by the phase locked loop 36 is also applied to this non-inverting input. The output of the signal level averager 37 is applied to the inverting input of the differential amplifier. The output of the differential amplifier generates an electrical signal comprising a series of DC voltage levels which represents the recovered binary logic levels from the data train applied to receiver 35. In the preferred embodiment of the present invention, threshold detector 38 is a commercially available RCA amplifier CA 3130A.

The series of binary logic levels forming the data train generated by threshold detector 38 is then applied to the clock synchronizer 19 of FIG. 1. The clock synchronizer 19 comprises a crystal controlled oscillator and means for generating a clock pulse train, where said pulse train has a time period equal to the time period of a single data bit of information. The clock synchronizer 19 also provides means for synchronizing said clock pulse train to the data train applied to the input of the clock synchronizer 19.

With reference to FIG. 4, there is shown a more detailed block diagram of the clock synchronizer 19 of FIG. 1. The crystal oscillator 40, which is of conventional design, generates a clock pulse train that is then applied to the first binary ripple counter 41. The Q2 output of the first binary ripple counter 41 is a lower frequency pulse train which is applied to the I2 input of the first switch 42. The Q3 output of the first binary ripple counter 41 applies a still lower pulse train to the I1 input of the second switch 43. The I1 input of the first switch 42 is connected to ground and the output the first switch 42 is applied to the I2 input of the second switch 43. The first switch 42 and the second switch 43, both of which are of conventional design, operate so that when their respective switching input S is at a low binary logic level, the I1 input is enabled to the output. If the switching input S goes to a high binary logic level, then the I2 input is enabled to the output.

The output from the threshold detector 38 of FIG. 3 is then applied to the input of the pulse generator 44, which generates a pulse of a high binary logic level for a time duration, significantly briefer than the time period of a single data bit of information, whenever there is a transition in the binary logic level between successive data bits applied to its input. The pulse generator means includes a common exclusive-or (EX-OR) gate with two logical inputs. The output of the threshold detector 38 of FIG. 3 is applied directly to one of the inputs of the EX-OR gate, and also applied to the other input of the EX-OR gate through a time delay network. The output pulse generated when there is a change of binary logic levels between successive data bits is of a time duration equal to the amount of time delay provided at the input of the EX-OR gate. The time delay function may be realized by applying the output of the threshold detector 38 of FIG. 3 through a resistor which is then applied to a common node of the second logical input of the EX-OR gate and a grounded capacitor. In the preferred embodiment of the present invention, the time delay should be approximately 2-3% of the time period of a single data bit of information. Pulse generator 44 will then apply its output to the S input of the second switch 43.

In the above described mode of operation, the second switch 43 will normally have its I1 input enabled to its output which is then applied to the second binary ripple counter 45. The second binary ripple counter 45 divides the frequency of the incoming clock pulse train, which in the normal mode of operation, is the Q3 output of the first binary ripple counter 41 as enabled through the output of the second switch 43. The divided frequency clock pulse train generated by the Q8 output of the second binary ripple counter 45 is then applied into the S input of the first switch 42. The Q2 output of the first binary ripple counter 41 is enabled to the output of the first switch 42 for one half of the time period of the clock pulse train generated by the Q8 output of the second binary ripple counter 45. The output of the first switch 42 is the clock pulse train generated by the Q2 output of the first binary ripple counter 41 amplitude modulated by the clock pulse train generated by the Q8 output of the second binary ripple counter 45 applied to the S input of the switch 42.

Where the time period of the clock pulse train generated by the Q8 output of the second binary ripple counter 45 is identical to the time period of a data bit of information, the Q8 output of the second binary ripple counter 45 will become synchronous with the data train as applied to the pulse generator 44. When pulse generator 44 applies a high binary logic level to the S input of the second switch 43, the output from the first switch 42 is enabled to the input of the second binary ripple counter 45. In this mode of operation the next transition state of the Q8 output of the second binary ripple counter 45 is delayed for a period of time that is equal to the time that the I1 input of the first switch 42 is enabled to the input of the second binary ripple counter 45 by the above described means; the next transition state of the Q8 output of the binary ripple counter 45 will be time shifted forward for a period of time that is equal to the time that the I2 input of the first switch 42 is enabled to the input of the second binary ripple counter 45. By also applying the Q8 output of the second binary ripple counter 45 to the S input of the first switch 42, a feedback loop is established so that synchronization will occur when the I1 and I2 inputs of the first switch 42 will be sequentially enabled to the input of the second binary ripple counter 45 for an equal period of time when a pulse is applied to the S input of the second switch 43. When synchronism occurs, the leading edge of the pulse train generated by the Q8 output of the second binary ripple counter 45 will occur in real time at the center of a data bit.

The synch signal 23 of FIG. 2 was chosen to maximize the number of transitions states between successive data bits. The synch signal 23 so chosen enables the clock synchronizer to synchronize the Q8 output of the second binary ripple counter 45 with the data train.

The data bits are sampled by applying the output of the threshold detector 38 of FIG. 3 to the sample circuitry 46 of FIG. 4. Sample circuitry 46 provides means by which the applied input at input I is enabled to and stored at the output when a leading edge of the clock pulse train applied to clock input C from the Q8 output of the secondary binary ripple counter 45. The sampling and storage means are conventional and are realized in the preferred embodiment of the present invention by a switch and a storage capacitor.

The crystal oscillator 40 also applies its clock pulse train to the decoder 20 of FIG. 1; and the Q8, Q11, and Q13 outputs of the secondar binary ripple counter 45 are also applied to said decoder 20. These clock pulse trains provide the timing for the said decoder 20 to execute the programs therein.

In the preferred embodiment of the present invention, the crystal oscillator 40 provides a clock pulse train of 2.4540 Mhz. The Q2 output and the Q3 output of the first binary ripple counter 41 generate clock pulse trains of 614.4 khz and 307.2 khz, respectively. The Q8, Q11, and Q13 outputs of the second binary ripple counter 45 generate pulse trains of 1200 hz, 150 hz, and 37.5 hz, respectively.

The above description of the synchronization means reveals how internal clock synchronization may be obtained without the transmission of a clock pulse train parallel to the transmission of the data train. Internal clock synchronization of the personal receiver 11 of FIG. 1 is obtained with a minimal amount of hardware.

The description of the present invention hereinabove has assumed that the personal receiver 11 is in an active monitoring mode, that is when said personal receiver 11 searches for and monitors transmissions of data trains. The decoder 20 of FIG. 1 includes an electrical energy source, comprising means for applying a constant electrical signal to active circuit elements, and said energy source is controlled by the programs internal to said decoder 20. When electrical energy is applied to the active circuit elements, the personal receiver 11 is then in an active monitoring mode. An inactive monitoring mode infers that the digital data recovery circuitry 18, and the visual alphanumeric display are not being supplied with electrical energy providing minimization of the electrical energy expended when the personal receiver 11 need not search for or monitor transmissions of data trains. A logic controlled reception duty cycle controls the monitoring mode, where during each duty cycle a determination is made whether the monitoring mode should be active.

With reference to FIG. 5, there is shown a more detailed block diagram of the decoder of FIG. 1. The reception duty cycle is initialized when the external on-off switch 50 enables electrical energy from energy source 51 to be applied to the voltage regulator 52. The voltage regulator 52, which is of conventional means, applies a constant electrical voltage level to the switch 53 and electrical energy supply line 54. The switch 53 enables the electrical energy applied at input I to the output O whenever switching input S is at a high binary logic level. The switch 53 applies the electrical energy at output O to the electrical energy supply line 75, which supplies electrical energy to the active circuit elements of FIG. 3 and display 13 of FIG. 1. More particularly, the electrical energy supply line 54 applies electrical energy to the central processing unit (CPU) 55 which then executes its initialization program logic by generating an address signal and applying such signal over address bus 56 to the read only memory (ROM) 57 which contains the instruction set for the program logic executed by the CPU 55. Each instruction of the instruction set comprises a plurality of binary logic levels that are applied to the data bus 58 when addressed and next applied to the CPU 55 which performs the operations encoded in said instruction. The output of the crystal oscillator 40 of FIG. 4 is applied to the CLOCK input of the CPU 55 to provide sequential execution of the instructions.

At the conclusion of the initialization program logic, the CPU 55 will generate a sleep signal and apply such signal to the NAND gate 59 where such signal is a high binary logic level. The second input of the NAND gate 59 has applied to it an electrical signal which is normally at a high binary logic level. When both inputs to the NAND gate 59 are a high binary logic level, the NAND gate 59 generates an electrical signal that is at a low binary logic level. This electrical signal when at the low logic level and applied to the PAUSE input will cause the CPU 55 to cease operation in the execution of the instruction sets of the program logic. Also the NAND gate 59 will apply the low binary logic level signal to the S input of the switch 53 thereby disabling the input I to the output O. The electrical energy is removed from the electrical energy supply line 75 and all active circuit elements of FIG. 3 and display 13 of FIG. 1. When the clock pulse train generated by the Q13 output of the second binary ripple counter 45 of FIG. 4 as applied to the isolation capacitor 61 goes to a low binary logic level, the reception duty cycle determines whether the monitoring mode should be activated. The isolation capacitor generates a negative pulse responsive to the trailing edge of the clock pulse train, and applies said pulse to the second input of the NAND gate 59, which generates a positive pulse applying said pulse to the S input of switch 53, enabling electrical energy to the output O and the electrical energy supply line 75. Said positive pulse is also applied to the PAUSE input of the central processing unit 55 which then resumes execution of the instruction sets until another SLEEP signal is generated. Capacitor 61 is recharged from a current through resistor 60.

During the active monitoring mode, the data stream from the sampling circuitry 46 of FIG. 4 is applied to the tristate buffer 63, when an enabling signal is applied from the CPU 55. The tristate buffer 63 accepts the data train and applies said train to the data bus 58 which transfers the data train under program control to the CPU 55, which analyzes the data prior to the data being accepted in the RAM 64.

The Q8 output generated by the second binary ripple counters 45 of FIG. 4 is applied to the isolation capacitor 70 which generates a negative pulse upon the occurance of a trailing edge of the clock pulse train applied to it. This negative pulse is applied to the INT input of the CPU 55 which causes a subroutine to be executed. This subroutine will enable the data stream to be accepted onto the data but 58 and applied to the CPU 55. Capacitor 70 is recharged from a current through resistor 71.

Whenever the CPU 55 generates an address signal to be applied to RAM 64, a simultaneous signal will be generated of a high binary logic level from the WAIT output and applied to the S input of switch 68 which the WAIT signal will over-ride the external on-off switch 50, enabling a constant source of energy to be applied to the electrical energy supply line 54. The WAIT signal is necessary to allow completion of the operations of the program logic whenever the RAM 64 is being addressed, protecting its memory contents in the process.

In the preferred embodiment of the present invention, the central processing unit 55 is RCA 1802 microprocessor which is commercially available, and the employment and programming of said processor is well documented in the art. The ROM 57 is preferrably any commercially available CMOS read only memory integrated circuit with the capability of storing at least four thousand eight bit words. The RAM 64 is preferrably any commercially available CMOS random access memory integrated circuit with the capability of storing at least one thousand eight bit words. The energy source 51 is preferably a NiCd battery of approximately 6.2 v and the energy source 65 is preferably a Li battery of at least 2 v but not exceeding 3 v. The NiCd battery is preferred for its nearly constant voltage output prior to becoming discharged whereas the Li battery is preferred because of its long shelf life since this battery is only used to supply microwatts of power to the RAM 64 when the NiCd is fully discharged or disabled from the voltage regulator 52. Voltage regulator 52 preferably provides a well regulated output voltage of five volts regulated within 0.05 volts regulated within 0.05 volts while supplying up to 10 ma of current. Should power from the voltage regulator drop below the voltage of energy source 65, diode 66 becomes forward viased and diode 67 becomes reverse biased whereby the RAM 64 is effectively non-volatile.

The visual alphnumeric display 13 of FIG. 1 may be any electronic digital display which has the capability of converting binary encoded characters into readable alphnumeric characters. In the preferred embodiment of the present invention, the visual alphanumeric display provides a readout of twenty characters by utilizing five Litronix DL1414 display modules of four characters apiece. A character is enabled to the display by first addressing that character stored in the RAM 64, applying said character to the data bus 58, and applying the character to the display module to be displayed at the location on said module determined by address signal applied from the address bus 56. In this mode of operation the display appears to the CPU 55 as additional memory locations. Alert functions, such as a beeper, may also be incorporated into the circuitry as virtual memory locations. These techniques are well known in the art and need not be further discussed.

It is within the scope of the invention to provide a hard copy record of the messages. A message may be retrieved from the RAM 64 in the usual manner. A character printer may be connected to the appropriate output port (not shown) of the CPU 55.

The structure of the personal receiver 11 of FIG. 1 has been described as well as a great deal of its operation. But the sequence of events that have been discussed above have been controlled by the program logic recorded permanently in the ROM 57 of FIG. 5. The program logic is given in exhibit "A" hereto for a particular embodiment of the system being described, and a flow chart of the operations of the central processing unit 55 programed by the program logic of Exhibit "A" is given in FIGS. 6, 7 and 8. By referring to the program of Exhibit "A" and the flow charts of FIGS. 6, 7 and 8 the programmed operation of the central processing unit 55 can be fully understood in great detail. It will be noted that the location (LOC) column on the left hand side of the program of Exhibit "A" identifies memory locations which are also liberally identified on the flow charts of FIGS. 6-8. Each line of the program identifies the contents of sixteen consecutive memory locations beginning with the location in the LOC column. All representations are hexadecimal numerals, and recognized by the RCA 1802 microprocessor preferred in the present invention. But so that the general reader will obtain an understanding of the program of the central processing unit 55, its flow charts of FIGS. 6-8 are described generally.

FIG. 6 shows a block diagram illustrating the logical sequence of initialization instructions executed by CPU 55 of FIG. 5. Request box 100 indicates that two internal registers to the CPU 55 (FIG. 5) are being dedicated as the main program counter register, which will contain the address of the program instructions contained in ROM 57 (FIG. 5), and the data pointer register, which will contain the address of the locations of stored data within RAM 64 (FIG. 5). Concurrently with the selection of registers, the $\overline{\text{INT}}$ input of CPU 55 is disabled until the initialization routine is completed, during which no data is to be applied to the tristate buffer 63 (FIG. 5). Once the main program counter register has been initialized, the sequence of instructions of request box 102 will clear and set the remaining internal registers of CPU 55. These registers are utilized by various subroutines, hereinafter described.

Decision box 104 indicates that RAM 64 will be scanned in the locations reserved for address signals. If the universal address signal is not located in RAM 64, request box 106 indicates that the universal address signal will be obtained by CPU 55 generating an address signal over address but 56 (FIG. 5) to be applied to a location in ROM 57 containing the universal address signal. The universal address signal is then placed on data bus 58 (FIG. 5), and applied to RAM 64 upon the generation of an address signal by CPU 55 specifying the location where such universal address signal is to be stored. The sequence of operations of request box 106 are not executed if the universal address signal has heretofore been stored in RAM 64.

The CPU 55 executes the instruction set of request box 108 clearing working locations in RAM 64 for various subroutines hereinafter described.

After specified locations in RAM 64 are cleared, the instructions of request box 110 indicate that data is read from ROM 57 and stored in RAM 64. This data initializes values for processing by subroutines, hereinafter described, controlling the aforementioned reception duty cycle and monitoring mode.

Upon the completion of the instructions contained in request box 110, the control of CPU 55 becomes governed by the main executive routine (EXEC) illustrated by program box 112.

FIG. 7 shows a block diagram illustrating the logical sequence of instructions of the main executive routine of program box 112 of FIG. 6. Request box 120 indicates that the $\overline{\text{INT}}$ output to CPU 55 (FIG. 5) is disabled; furthermore, the execution of the EXEC logic is synchronized with the negative pulse generated by capacitor 61 (FIG. 5), the operation of which has heretofore been fully described.

Input-output box 121 indicates that CPU 55 (FIG. 5) will generate a high binary logic level at the SLEEP output. Upon the occurance of the negative pulse generated by capacitor 61 (FIG. 5), and the responsive pulse thereto applied to the $\overline{\text{PAUSE}}$ input of CPU 55, execution of the EXEC logic is synchronized with said pulse. The timing for the reception duty cycle is derivative from said pulse, and furthermore, during the active portion thereof, EXEC logic is executed, determining if any action should be taken, either under program control or user control. The program controlled actions, hereinafter described, are generally internal management subroutines whereas the user controlled actions occur when the user desires information, such as the display of a message stored in the RAM 64 (FIG. 5). After the above actions are completed, if necessary, a decision is made whether the reception duty cycle should maintain its sequential operation or if the monitoring mode should be activated for the reception of a data train. The EXEC logic governing the active monitoring mode is cycled for each character of incoming data and will continue until the entire data train has been monitored, providing that the header 21 (FIG. 2) of the data train contains an address signal 25 (FIG. 2) to which a personal receiver 11 (FIG. 1) is responsive. The EXEC logic executed during the active portion of the reception duty cycle is set forth in detail as follows.

Request box 122 indicates that the visual alphanumeric display 13 (FIG. 1) will be supplied battery power during the active portion of the reception duty cycle. However, the data inputs to the display 13 will be in an unknown state. To prevent the unwanted display of extraneous characters, the instructions of request box 122 are executed to cause binary encoded blanks to be retrieved from the ROM 57 (FIG. 5) and applied to the display 13 (FIG. 1).

Upon completion of the display blanking, CPU 55 (FIG. 5) must then determine the sequence of events, if any, to be performed within a personal receiver 11 (FIG. 1). The events to be performed are determined by the instructions of request box 124. A plurality of register or memory or memory locations within CPU 55 (FIG. 5) or RAM 64 (FIG. 5), respectively, are decremented each time the instructions of request box 124 are executed. Should any of these locations be decremented to zero, additional logic is executed to indicate that a certain event is to be performed. In the preferred embodiment of the present invention, there are five events controlled by these locations which serve as program controlled timers. The sleep/wake timer contains an initial value determined by request box 110 (FIG. 6), and provides reception duty cycle related information. In the normal mode of operation, the sleep/wake timer is equal initially to the time duration of the plurality of sync signals 23 (FIG. 2) divided by a constant determined so that the timer will be decremented to zero at least three times during the time period required for the transmission of synch signals 23 (FIG. 2). The event performed is the active monitoring of possible data trains. The sleep/wake timer is also responsive to command signals 27 (FIG. 2), from which EXEC logic would determine that the following message portion 22 (FIG. 2) contains information to be stored in the sleep/wake timer location. The transmission of sleep/wake timer information enables the remote shut down of the personal receiver 11 (FIG. 1) for a given time in which there will be no transmissions of data trains.

A second event is controlled by the out-of-range timer, which upon being decremented to zero will warn the user of a personal receiver 11 (FIG. 1) that that personal receiver 11 is out of range of the transmitting antenna 16 (FIG. 1). The out-of-range timer is initialized by the instructions of request box 110 (FIG. 6) and this initial value will be restored upon the monitoring of any header 21 (FIG. 2). The out-of-range timer is also responsive to command signals 27 (FIG. 2), from which EXEC logic would determine that the following message portion 22 (FIG. 2) contains information to be stored in the out-of-range timer location.

The third event is controlled by the drift timer, the value of which is responsive to and initially equal to drift signal 29 (FIG. 2). A transmission system 10 (FIG. 1) may transmit sequential, repeated data trains. The received message portion 22 (FIG. 2) may contain uncorrectable errors in transmission which can be corrected by EXEC logic by comparing the received data with new data of a repeated transmission. Active monitoring of the repeated data trains will be maintained until the drift timer is decremented to zero, which signifies end of all transmissions of the data train, or until the received message contains no errors. In the latter situation, the EXEC logic increments the sleep/wake timer by the value remaining in the drift timer, and the monitoring mode is de-activated during the remainder of the repeated transmissions of data trains which are not necessary when the received message contains no errors.

The remaining events controlled by timers are for internal management of sequencing the rate at which characters of messages are applied to the alphanumeric display 13 (FIG. 1) or the rate an audible alert, such as a beeper, will be activated. The described function occurs when the timer is decremented to zero.

Upon completion of the instructions of request box 124, control of CPU 55 (FIG. 5) is governed by the instructions of the request box 126, which are executed only when a message, either received or prestored in ROM 57 (FIG. 5), is to be applied to alphanumeric display 13 (FIG. 1). The decision controlling execution of these instructions is governed by the data generated by the execution of these instructions of request box 128. A plurality of external switches on personal receiver 11 (FIG. 1) generates signals which are applied directly to the input ports (not shown) of CPU 55 (FIG. 5). The logic of request box 128 then performs the function requested by the activated switch. In the preferred embodiment of the present invention, four external switches are utilized. Activation of the first switch causes execution of the logic necessary to retrieve the first received message stored in the RAM 64 (FIG. 5) to be displayed on the alphanumeric display 13 (FIG. 1). The second switch causes execution of the logic necessary to display a prestored message in the ROM 57 (FIG. 5) to be displayed should the EXEC logic determine that one of the prestored messages is appropriate, such as the out-of-range message hereinabove discussed. Additional prestored messages are discussed hereinafter. Logic responsive to the third switch will rotate the order of received messages in the RAM 64 (FIG. 5) enabling the recipient of messages to selectively view any message contained in RAM 64. The fourth switch, when activated simultaneously with the first switch, will erase the last viewed message from RAM 64, enabling selective deletion of any message contained therein.

Upon the completion of the instructions of request box 128, the EXEC logic must determine if the personal receiver 11 (FIG. 1) should be placed in the active portion of the reception duty cycle. Decision box 130 contains instructions to base the decision on whether the sleep/wake timer, described above, has been decremented to zero, and if so, the personal receiver 11 (FIG. 1) is placed into the active portion of the reception duty cycle. During this active portion, the $\overline{INT}$ input to CPU 55 (FIG. 5) will be enabled to allow data to be applied to the tristate buffer 63 (FIG. 5) as controlled by the interrupt service routine, hereinafter described. However, only the possible transmission of synch signals 23 (FIG. 2) is monitored during the reception duty cycle. When synch signals 23 have been recognized, the reception duty cycle is disabled and the active monitoring mode is enabled for the continuous reception of the remaining data train.

Decision box 130 also contains instructions responsive to the remaining timers being decremented to zero, however, the personal receiver 11 (FIG. 1) is not placed in the active portion of the reception duty cycle, but logic is executed to perform the indicated event.

Should decision box 130 determine an event is to be performed, the instructions of request box 132 are executed. The events are queried and processed so that only one such event is performed each time the instructions of request box 132 are executed should two or more of the aforementioned timers be simultaneously decremented to zero. Each timer has a corresponding queue which is set upon the timer being decremented to zero. Each queue, in the preferred embodiment of the present invention, is a binary data bit contained in an internal register of CPU 55 (FIG. 5) dedicated for queue processing.

Upon the completion of the logic of request box 132, the instruction of request box 134 may be executed if a hard copy printer is connected to the personal receiver 11 (FIG. 1) and more particularly to the appropriate output (not shown) of CPU 55 (FIG. 5). Execution of the logic of request box 134 is repeated until each data bit of message has been addressed at its location in RAM 64 (FIG. 5), placed on the data bus 58 (FIG. 5), and stored in the accumulator of the CPU 55 (FIG. 5). When a character of message text has been formed, the contents of the accumulator of CPU 55 is applied to a hard copy printer.

Upon completion of the instructions of request box 134, CPU 55 (FIG. 5) determines if the interrupt service routine, hereinafter described, has made data available for processing by the EXEC logic of request box 136. Data is available for processing upon the reception of a synch signal 23 (FIG. 2), and thereafter upon the reception of a completed character of any signal within header 21 (FIG. 2) or message portion 22 (FIG. 2). The logic of request box 136 is state dependent on the logic of request box 138. The state dependency enables the EXEC logic to determine if the incoming data is one of the plurality of signals contained in header 21 (FIG. 2) or message portion 22 (FIG. 2). The state enables a control means to determine whether the monitoring mode should be active or passive. In the preferred embodiment of the present invention, the state assignments are negative when no data train has been received and becomes positive upon recognition of a synch signal 23 (FIG. 2). Each of the remaining signals, when recognized, increments the state. The state determines which signal is to be expected in the incoming data train. The state comprises, generally, a plurality of binary logic levels, and preferably is an eight bit value located in a dedicated register internal to CPU 55 (FIG. 5).

When three of said synch signals 23 (FIG. 2) have been recognized, the reception duty cycle is disabled and the active monitoring mode is enabled for the continuous reception of the remaining data train. The instruction set of request box 136 is executed every time the interrupt service routine, hereinafter described, makes data available for processing.

The logic of request box 136 is also able to detect and correct errors in transmission of the header 21 (FIG. 2) for those signals which are encoded by the aforementioned hamming code. Errors in said message portion 22 (FIG. 2) are detected by said parity check signal 33 (FIG. 2), described above. Instructions of request box 136 will also generate a parity check signal internal to personal receiver 11 (FIG. 1). The internally developed parity check signal and received parity check signal 33 (FIG. 2) are then compared at the completion of the reception of the data train. If the two signals are not equal, and no subsequent repeated transmissions of the data train are forthcoming, the recipient of message text 32 (FIG. 2) will then be warned that the viewed message contains an unspecified error. However, if repeated data trains are forthcoming, each character of the new message portion 22 (FIG. 2) will be compared with the stored characters of the previous message, each character corrected if necessary, and a new internal parity check signal will be generated. When the parity check signal 33 (FIG. 2) and the internally generated parity check signal are equal, the stored message is error free. The comparison of repeated data trains and more particularly the message portion 22 (FIG. 2) thereof, is continued until both parity check signals are equal or until the drift timer is decremented to zero. The logic for generating the parity check signal is contained in locations OCDA through OD44 of request box 138.

The logic of request box 136 is also responsive to the length of message signal 28 (FIG. 2) and determines the amount of free memory available in RAM 64 (FIG. 5) in which to store the incoming message text 32 (FIG. 2). However, logic of request box 138 is also responsive to a command signal 27 (FIG. 2) which may generate a state that will allow the message storage locations of RAM 64 (FIG. 5) to be overwritten with a message text 32 (FIG. 2) preceded by a command signal 27 (FIG. 2) which indicates priority message.

The logic of request box 136 is also responsive to the format signal (FIG. 2). As heretofore described, the use of the format signal 31 enables a predetermined stored message to be retrieved from the ROM 57 (FIG. 5) and displayed prior to the display of the received message text 32 (FIG. 2) when desired. The prestored messages responsive to the format signal 31 (FIG. 2), as well as the prestored messages heretofore described, are stored at locations 0908 through 09AC.

After the instructions of request box 136 have been executed, a decision must be made if the active mode is to be maintained or if the inactive mode can be resumed as indicated by decision box 140. The decision is dependent on the state value generated by the logic of request box 138, and should the state value indicate that further data is expected, as hereinabove described, the active mode is maintained, the unit timer, hereinafter described, is queried, and control of the CPU 55 (FIG. 5) is routed as indicated by decision box 142. However, if the state value at decision box 140 indicates that the inactive mode can be resumed, the control of CPU 55 (FIG. 5) is returned to the beginning of the main executive routine and more particularly to request box 120.

Whenever capacitor 70 (FIG. 5) generates a negative pulse and such pulse is applied to the INT input of CPU 55 (FIG. 5) when the EXEC logic has enabled such interrupts to occur, the control of the CPU 55 is governed by the interrupt service routine of FIG. 8. The interrupt service routine enables the incoming data train to be serially applied to tristate buffer 63 (FIG. 5) until one character is formed. This character is then compared with the known synch signal 23 (FIG. 2) configuration. When a synch signal 23 has been recognized, the interrupt service routine will signify that data is available to the EXEC logic and more particularly to request box 136 of FIG. 7. The logic of the interrupt service routine is hereinafter set forth in detail.

The request box 150 indicates that contents of the registers internal to CPU 55 (FIG. 5) are stored in RAM 64 (FIG. 5) for future reference. The registers are restored to these values upon completion of the interrupt service routine to enable return of the execution of the EXEC logic at the location where interrupted.

After the contents of the registers have been saved, control of CPU 55 (FIG. 5) is governed by the instructions of request box 152 which indicates that the current data bit of the data train has been applied to tristate buffer 63 (FIG. 5), and stored in a working location of RAM 64 (FIG. 5).

A decision must be made by CPU 55 (FIG. 5), as indicated by decision box 154, which inquires the state value generated by request box 138 (FIG. 7). Should the state value be equal to zero, the logic of the interrupt service routine determines if the accumulated data bits have formed a synch signal 23 (FIG. 2). If synch signal 23 pattern is found as indicated by decision box 156, the state value is incremented to one, as indicated by request box 158. Request box 160 is then executed to indicate to the EXEC logic that data is available for processing by request box 136 (FIG. 7).

Should the logic of decision box 154 indicate that the state value is not equal to zero, the state is re-examined by decision box 162 to determine if the state value is positive or negative. In the preferred embodiment of the present invention, a negative state value indicates that no data train is being received by personal receiver 11 (FIG. 1) and a positive state value indicates that the EXEC logic is expecting to receive further data as hereinabove described.

After the state value has been determined by decision box 162, and assuming it is found to have a positive state value, a decision is made whether the accumulated data bits have formed the next character of the data train. Decision box 164 indicates that, should a character have been formed, this new character is to be made available to the EXEC logic for processing. Otherwise, data bits are collected and stored in the working locations of RAM 64 (FIG. 5) until the next character has been formed.

After the above decisions have been made, and the appropriate instructions executed, the instructions of request box 166 are executed. These instructions decrement the unit timer which comprises a plurality of binary logic levels. In the preferred embodiment of the present invention, the unit timer comprises eight bits of information contained in an internal register of CPU 55 (FIG. 5). The unit timer is decremented each time the interrupt service routine is entered, and therefore responsive to the Q8 output of second binary ripple counter 45 (FIG. 4). Preferrably, the unit timer has an initial value of eight that is decremented to zero, which indicates the unit timer fired, and reset to eight again.

After the unit timer has been decremented, a decision is made, as indicated by decision box 168, whether the unit timer is at a zero or non-zero value. Should the unit timer be at a non-zero value, control of CPU 55 (FIG. 5) is governed by the instructions of request box 170. The logic of request box 170 restores the registers of the CPU 55 (FIG. 5) to the values contained therein at the moment of entry into the interrupt service routine. Control of the CPU 55 is thus returned to the EXEC logic of FIG. 7.

The decision, should the unit timer have been decremented to zero, will cause execution of the logic of request box 172 which restores the unit timer to its high value. The request box 174 indicates that the unit timer has fired and this information is saved for the determination to be made by the decision box 142 of FIG. 7.

The above logical flow charts of FIG. 6, FIG. 7, and FIG. 8 have been described with respect to a preferred embodiment thereof, but it will be understood that the invention is entitled to protection within the full scope of the claims which follow the appended computer program marked as Exhibit "A".

EXHIBIT "A"

| LOC | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0000= | 71 | 20 | C0 | 08 | AE | 72 | 83 | 72 | F3 | FB | FF | 76 | 94 | 7F | 00 | B4 |
| 0010= | 3A | 19 | F8 | 08 | B4 | 85 | F9 | 08 | A5 | 22 | 72 | 52 | FE | 12 | 72 | 70 |
| 0020= | 22 | 78 | 22 | 73 | 22 | 6C | 76 | 73 | 93 | 73 | F8 | 04 | B3 | F0 | 76 | 52 |
| 0030= | 84 | 3A | 53 | F0 | FB | D4 | 3A | 66 | 14 | 22 | F8 | F1 | A3 | 85 | FA | 09 |
| 0040= | F1 | A5 | 12 | F0 | B5 | 91 | 73 | 52 | 85 | F6 | 85 | C7 | F9 | 02 | F9 | 01 |
| 0050= | A5 | 30 | 65 | FE | 33 | 66 | F0 | FE | E3 | 22 | 3B | 5F | 02 | F3 | 52 | 72 |
| 0060= | E2 | FB | 80 | 32 | 3A | 12 | 12 | 30 | 05 | E0 | 71 | 20 | 97 | FA | 7F | B7 |
| 0070= | 92 | BC | F8 | FB | AC | 91 | 5C | A5 | 7A | E1 | 6A | F8 | 1F | A8 | E8 | F8 |
| 0080= | 20 | B8 | 73 | 73 | 73 | 73 | 73 | 73 | 73 | 73 | 73 | 73 | 73 | 73 | 73 | 73 |
| 0090= | 73 | 73 | 73 | 73 | 73 | 73 | F8 | 08 | B4 | A8 | 58 | 30 | B0 | 85 | F6 | C3 |
| 00A0= | 07 | 89 | FA | 04 | C2 | 03 | 5A | E0 | 71 | 00 | 85 | FA | F7 | A5 | 70 | 20 |
| 00B0= | F8 | 09 | B8 | F8 | EA | A8 | 92 | BC | F8 | ED | AC | D8 | 3A | E2 | 97 | FA |
| 00C0= | 10 | 32 | C9 | 97 | FA | EF | B7 | 30 | E2 | 97 | F9 | 10 | B7 | 2C | F8 | 01 |
| 00D0= | 5C | 89 | FE | 3B | DB | F6 | A9 | F8 | 0B | 30 | D0 | 1C | 91 | A4 | 97 | F9 |
| 00E0= | 80 | B7 | D8 | CA | 01 | 1F | 89 | F6 | C3 | 01 | 15 | 19 | 92 | BA | 96 | FA |
| 00F0= | EF | B6 | FA | 08 | CA | 01 | 15 | F8 | E5 | AA | 0A | FA | FD | F9 | C1 | 30 |
| 0100= | 01 | 5A | 87 | FA | 10 | 3A | 0D | 87 | FA | 1B | F9 | A0 | A7 | 97 | F9 | 80 |

| LOC | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0110= | B7 | 99 | F9 | 40 | B9 | 4C | 52 | 0C | 2C | 2C | 73 | 02 | 5C | 1C | 1C | 1C |
| 0120= | 1C | D8 | 3A | A8 | 97 | FA | 20 | 32 | 39 | 97 | FA | CF | F9 | 80 | B7 | F8 |
| 0130= | FC | A4 | F8 | EE | AC | 91 | 5C | 30 | A8 | F8 | 20 | B8 | BA | F8 | 08 | A8 |
| 0140= | 87 | FA | 10 | 58 | 32 | A8 | 87 | F9 | 08 | A7 | 97 | F9 | 80 | B7 | 60 | F0 |
| 0150= | AA | 2C | F0 | C6 | F8 | 28 | FF | 01 | 73 | 52 | 87 | FA | 20 | 3A | 62 | F8 |
| 0160= | 05 | C8 | F8 | 03 | 5C | 02 | 3A | 82 | F8 | 20 | 5A | AA | 91 | 73 | 87 | FA |
| 0170= | F7 | A7 | FA | 04 | 32 | 7C | 87 | FA | EF | A7 | 30 | 7F | F8 | 1A | 5C | 60 |
| 0180= | 30 | 9A | F6 | 33 | 9E | F6 | 33 | 9A | 52 | 87 | FA | 40 | 3A | 97 | 02 | F6 |
| 0190= | 33 | 9A | 87 | FA | 80 | 32 | 9A | F8 | 0F | 5C | F8 | 20 | 30 | A2 | 28 | 2A |
| 01A0= | F8 | 2A | 58 | 5A | 60 | 60 | 8A | 5C | 86 | 32 | B5 | 97 | FA | 40 | 32 | B8 |
| 01B0= | 87 | F6 | 3B | B5 | 26 | C0 | 03 | 5A | 26 | 86 | 3A | B5 | 92 | BC | F8 | E8 |
| 01C0= | AC | 0C | 32 | F6 | A8 | FE | 3B | D0 | 90 | 5C | A8 | 96 | FA | 02 | 32 | FC |
| 01D0= | 1C | 28 | 4C | BA | 0C | AA | 2C | F8 | 02 | B8 | 99 | F6 | 3B | F3 | 88 | 3A |
| 01E0= | E5 | F8 | 3C | 30 | F4 | FB | 15 | 3A | F3 | 2C | 5C | F8 | 09 | BB | F8 | 56 |
| 01F0= | AB | 30 | F6 | 08 | A8 | D8 | 96 | FA | 02 | CA | 07 | 33 | C0 | 03 | 08 | FF |
| 0200= | 1C | 6A | 6F | 75 | 6A | 7C | 89 | 6A | 8C | 90 | 90 | 90 | 94 | 6A | 99 | 9D |
| 0210= | 6A | 90 | A2 | AE | B2 | B6 | CE | D9 | ED | CE | D9 | F7 | 0E | FE | FE | 33 |
| 0220= | F2 | 0E | FA | 08 | 32 | 35 | 96 | FA | 04 | 32 | 3C | 1A | 1A | 1A | 1A | 9A |
| 0230= | 5C | 1C | 8A | 5C | 2C | F8 | 16 | 2C | 5C | 1C | 30 | B6 | 0A | FA | 03 | 52 |
| 0240= | 1A | 1A | 0A | FA | 03 | FE | FE | E2 | F1 | 52 | 91 | AB | 02 | FF | 0A | 1B |
| 0250= | 33 | 4D | 2B | FC | 0A | 1C | 1C | 5C | 8B | FC | 30 | 1C | 5C | 9C | BB | 8C |
| 0260= | AB | 2C | 2C | 2C | 2C | 0C | FC | 01 | 5C | D0 | 1C | 1C | 0C | 30 | 59 | F8 |
| 0270= | 2F | 1C | 1C | 30 | 5B | 0A | FA | 7C | F6 | F6 | 30 | 49 | F8 | 2F | 52 | 1A |
| 0280= | 9A | 5C | 1C | 8A | 5C | 2C | 02 | 30 | 71 | 0A | 30 | 49 | F8 | 20 | 30 | 7E |
| 0290= | F8 | 20 | 30 | 71 | 0A | FA | 3C | 30 | 78 | F8 | 3A | 30 | 7E | 0A | FA | 3F |
| 02A0= | 30 | 49 | 0A | FA | 40 | 3A | AA | F8 | 41 | C8 | F8 | 50 | 30 | 71 | F8 | 4D |
| 02B0= | 30 | 7E | F8 | 0D | 30 | 71 | 0E | FA | 10 | 3A | C2 | F8 | 19 | 2C | 5C | 1C |
| 02C0= | 30 | ED | F8 | A3 | AB | F8 | 09 | BB | 2C | 0C | FC | 01 | 5C | 1C | 0B | FB |
| 02D0= | 0D | 3A | 69 | 2C | 0C | FC | 01 | 5C | 1C | 9A | BB | 8A | AB | 0B | 52 | 1A |
| 02E0= | 9A | 5C | 1C | 8A | 5C | 2C | 02 | FB | 0D | 3A | 69 | 30 | 64 | 0E | FA | 20 |
| 02F0= | 3A | FC | 4C | BB | 0C | AB | 2C | 91 | 2C | 5C | 30 | 69 | F8 | A9 | 30 | C4 |
| 0300= | 01 | 02 | 04 | 08 | 10 | 20 | 40 | 80 | 92 | BA | F8 | FF | AA | 87 | F6 | 33 |
| 0310= | 44 | 0B | FE | 3B | 20 | 99 | FA | 14 | 3A | 5A | 99 | F9 | 02 | B9 | 30 | 5A |
| 0320= | 0B | FB | 0D | 32 | 35 | 0A | AD | 4B | 5D | 2D | 8D | 5A | FB | 0B | 3A | 59 |
| 0330= | 0B | FB | 0D | 3A | 36 | 1B | F8 | 26 | A6 | 17 | 87 | FA | 02 | 32 | 5A | F8 |
| 0340= | FE | A6 | 30 | 5A | 87 | FA | FD | A7 | F8 | 20 | BD | F8 | 1F | AD | 5A | F8 |
| 0350= | 20 | 5D | 2D | 8D | FB | 0B | 3A | 4F | 27 | 16 | E2 | 97 | FA | 0F | B8 | 91 |
| 0360= | 3C | 64 | F9 | 01 | 3D | 68 | F9 | 02 | 3E | 6C | F9 | 04 | 3F | 70 | F9 | 08 |
| 0370= | A8 | 52 | 32 | 78 | 97 | F9 | 80 | B7 | 98 | F3 | 32 | 9B | 98 | 32 | A4 | FB |
| 0380= | 08 | 3A | 88 | 88 | FB | 09 | 32 | B2 | 98 | FB | 09 | 3A | 92 | 88 | FB | 08 |
| 0390= | 32 | 9E | 88 | 52 | 97 | FA | F0 | F1 | B7 | 30 | EB | 88 | 3A | EB | 96 | FA |
| 03A0= | FE | B6 | 30 | 92 | 96 | F6 | 33 | 92 | 96 | F9 | 01 | B6 | 88 | FF | 09 | 33 |
| 03B0= | 92 | 88 | AC | 92 | BA | F8 | E5 | AA | 99 | FA | 10 | 32 | EE | 99 | FA | EF |
| 03C0= | B9 | 91 | 5A | 0E | FE | FE | 33 | D8 | 1E | 1E | 0E | 2E | 2E | FE | 3B | D8 |
| 03D0= | 8C | FB | 08 | 32 | D8 | F8 | 01 | AC | 88 | 52 | 97 | FA | F0 | F1 | B7 | 8C |
| 03E0= | A8 | F8 | 04 | B8 | 08 | A8 | 87 | FA | E7 | A7 | D8 | C0 | 04 | 09 | 0A | 32 |
| 03F0= | C3 | 99 | F9 | 10 | B9 | F8 | 08 | 30 | D7 | FF | FF | FF | FF | FF | FF | FF |
| 0400= | E2 | 30 | 53 | F0 | 80 | F0 | F0 | F0 | A2 | 97 | FE | CB | 00 | 78 | E0 | 70 |
| 0410= | 20 | 92 | BC | F8 | FA | AC | 0C | FA | 0E | 52 | 96 | FA | F1 | F1 | B6 | FA |
| 0420= | 02 | 32 | 2D | F8 | E5 | AC | 0C | 32 | 2D | 99 | F9 | 10 | B9 | C0 | 05 | 00 |
| 0430= | 99 | FA | 08 | B9 | 9E | BB | 8E | AB | 0E | FE | FE | 33 | 44 | 1B | 1B | 0B |
| 0440= | FA | 7F | 5B | 1B | 92 | BC | F8 | EA | AC | EC | 8B | 73 | 9B | 73 | F8 | FF |
| 0450= | 5C | 30 | B9 | 86 | 3A | 68 | 99 | FA | 08 | F9 | 01 | B9 | 96 | FA | 10 | 32 |
| 0460= | AC | F8 | 10 | BB | 91 | AB | 30 | 44 | 96 | FA | 02 | 3A | F0 | 87 | FB | 02 |
| 0470= | A7 | F6 | 3B | F0 | 87 | FA | 02 | 3A | 7C | F8 | 01 | C8 | F8 | FE | A6 | D0 |

| LOC. | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0480= | 0E | FE | FE | 33 | 30 | 9E | BC | 8E | AC | EC | 72 | FA | 07 | 52 | 8E | F4 |
| 0490= | AE | E2 | 9E | 74 | BE | 0E | FE | FE | 3B | 30 | F8 | 10 | BE | F8 | 04 | AE |
| 04A0= | 30 | 30 | 99 | FA | 18 | F9 | 04 | B9 | 96 | FA | DF | B6 | F8 | 09 | BB | F8 |
| 04B0= | 56 | AB | 92 | BC | F8 | E8 | AC | 91 | 5C | 91 | 2C | 5C | 2C | 5C | 87 | FA |
| 04C0= | FC | A7 | 17 | 96 | FA | 02 | 3A | D0 | F8 | 01 | A6 | 97 | FA | BF | B7 | D0 |
| 04D0= | 97 | F9 | 40 | B7 | F8 | 02 | A6 | 91 | AD | 92 | BA | F8 | FF | AA | F8 | 14 |
| 04E0= | 5A | D0 | 1E | 1E | 0E | 2E | 2E | FE | 33 | 30 | 99 | FA | 08 | F9 | 20 | B9 |
| 04F0= | D0 | F0 | B0 | D0 | E0 | 90 | A0 | C0 | 80 | EE | EE | EE | EE | 7F | FF | FF |
| 0500= | 85 | F6 | C3 | 07 | 89 | 99 | 32 | EA | FA | 40 | 32 | 38 | 99 | FA | 16 | 3A |
| 0510= | 38 | 97 | FA | 20 | 3A | 38 | 97 | FA | 40 | 3A | 1E | 86 | 3A | 38 | 99 | FA |
| 0520= | BF | B9 | 87 | F9 | 10 | A7 | 92 | BC | F8 | F6 | AC | EC | F8 | 20 | 73 | 91 |
| 0530= | 73 | F8 | 01 | 73 | 91 | 73 | 30 | EA | 99 | FA | 08 | 32 | 76 | 99 | FA | F7 |
| 0540= | B9 | 89 | F6 | 3B | 68 | FE | A9 | 92 | BA | 96 | FA | 08 | 3A | 68 | F8 | E5 |
| 0550= | AA | 0A | FA | FE | F9 | C2 | 5A | 87 | FA | F0 | FB | 10 | 32 | 64 | 87 | FA |
| 0560= | 1F | F9 | 64 | A7 | 99 | F9 | 40 | B9 | F8 | F1 | AA | 4A | 52 | 0A | 2A | 2A |
| 0570= | EA | 73 | 02 | 5A | 30 | EA | 99 | FA | 20 | 32 | ED | 99 | FA | 17 | 3A | ED |
| 0580= | 84 | FC | 03 | 3B | ED | 97 | FA | 60 | 3A | ED | 92 | BA | F8 | E6 | AA | 9E |
| 0590= | BF | BC | 8E | AF | AC | 0C | FE | FE | 33 | D9 | 1C | 1C | 1C | EC | 72 | FE |
| 05A0= | 3B | 9E | FE | 33 | CE | 2C | 7B | 72 | 5F | 1F | 72 | 5F | 1F | 72 | 5F | 1F |
| 05B0= | 38 | 1F | 4C | 5F | FE | 3B | B1 | FE | 3B | A9 | 92 | BC | F8 | E2 | AC | 8F |
| 05C0= | 73 | 9F | 5C | 99 | FA | 80 | 3A | E6 | 1A | 0A | F9 | E0 | 30 | E1 | F8 | C0 |
| 05D0= | 5F | F8 | 10 | BE | F8 | 04 | AE | 30 | BA | 0A | F9 | 02 | 5A | 1A | 0A | F9 |
| 05E0= | C0 | 5A | 99 | F9 | 04 | B9 | 99 | FA | 5F | B9 | C0 | 07 | 14 | 92 | BC | 99 |
| 05F0= | FA | 14 | C2 | 06 | 75 | 86 | 3A | EA | 97 | FA | 40 | 3A | EA | C0 | 06 | 00 |
| 0600= | 99 | FA | 10 | 32 | 21 | F8 | E5 | AC | 0C | 3A | 17 | 99 | FA | EF | F9 | 03 |
| 0610= | B9 | 96 | F9 | 20 | B6 | 30 | 72 | 52 | 91 | AA | F8 | 0D | BA | BB | 02 | 30 |
| 0620= | 2D | F8 | E6 | AC | 91 | AA | F8 | 09 | BA | 0C | 32 | 67 | 52 | F6 | CF | 1A |
| 0630= | F6 | CF | 1A | F6 | CF | 1A | F6 | CF | 1A | F6 | CF | 1A | F6 | CF | 1A | F6 |
| 0640= | CF | 1A | C4 | 8A | A8 | F8 | 03 | B8 | E2 | 08 | F3 | 5C | 0A | AB | F8 | 09 |
| 0650= | BB | 96 | FA | 02 | 3A | 60 | 0B | FB | 0D | 32 | 72 | F8 | 01 | A6 | 30 | 72 |
| 0660= | 97 | F9 | 40 | B7 | 94 | 30 | 5D | 1C | F8 | 0D | BA | 0C | 3A | 2C | 99 | FA |
| 0670= | FB | B9 | C0 | 07 | 14 | 99 | FA | 02 | C2 | 0A | CB | 92 | BC | F8 | E6 | AC |
| 0680= | E2 | 9E | BA | 8E | AA | 4A | 1A | FE | FE | 3B | 91 | F8 | 02 | 5C | 52 | 30 |
| 0690= | D1 | 99 | F6 | 33 | B2 | 0A | FA | 2C | 5C | 30 | B2 | 1A | 0A | 2A | 52 | 8A |
| 06A0= | F4 | A8 | 0A | FA | 07 | 52 | 9A | 74 | BA | 88 | AA | 0A | FE | FE | 33 | D1 |
| 06B0= | 1A | 1A | 0A | 2A | 2A | FE | 3B | 9B | 96 | FA | 20 | 32 | C1 | 9A | BE | 8A |
| 06C0= | AE | 99 | FE | 33 | D1 | 99 | F9 | 40 | B9 | 87 | FA | 1B | A7 | 0C | F9 | 80 |
| 06D0= | 5C | 89 | FA | 50 | 32 | DA | 52 | 0C | F1 | 5C | 1C | F8 | C0 | 5C | 92 | B8 |
| 06E0= | F8 | E3 | A8 | 48 | 3A | ED | 08 | FE | 33 | ED | F8 | C8 | 5C | 99 | F6 | 3B |
| 06F0= | FC | 89 | F6 | F8 | 02 | C7 | F8 | 01 | 52 | 0C | F1 | 5C | 99 | C0 | 07 | 00 |
| 0700= | FA | FC | F9 | 04 | B9 | 96 | FA | 20 | 32 | 14 | 96 | FA | DF | B6 | 91 | 5C |
| 0710= | 2C | F8 | 01 | 5C | 97 | FA | 40 | 32 | 89 | 87 | F6 | 3B | 23 | 86 | 3A | 89 |
| 0720= | 27 | 30 | 2A | 94 | 52 | E2 | 86 | F3 | 32 | 89 | 8D | 3A | 33 | 99 | FA | 14 |
| 0730= | C2 | 01 | BC | 94 | A6 | 92 | BA | F8 | FF | AA | 8D | 32 | 40 | 9D | 30 | 79 |
| 0740= | 0B | FE | 3B | 55 | 91 | A6 | 97 | FA | BF | B7 | 99 | FA | 14 | 3A | 89 | 99 |
| 0750= | F9 | 02 | B9 | 30 | 89 | 0A | 3A | 67 | 48 | FB | 0D | 32 | 5E | 2B | F8 | 14 |
| 0760= | 5A | 17 | F8 | 1E | A6 | 30 | 89 | F8 | 08 | AD | 0B | FB | 0D | 3A | 74 | 5A |
| 0770= | F8 | 0D | 30 | 79 | 0A | FF | 01 | 5A | 4B | 2D | 76 | BD | E0 | 71 | C0 | 61 |
| 0780= | 3B | 86 | C4 | C4 | C4 | 61 | E0 | 70 | 20 | E2 | 84 | FB | FC | 3A | 92 | 86 |
| 0790= | 32 | D3 | 85 | F6 | 7A | CB | 08 | 2C | 96 | FE | 3B | AA | 14 | 84 | FB | 18 |
| 07A0= | CA | 08 | 1C | 96 | FA | 7F | B6 | C0 | 08 | 06 | 85 | FA | F0 | 3A | B5 | 95 |
| 07B0= | FA | 0F | 52 | 30 | D2 | FE | 33 | C0 | 7B | 95 | FA | 0F | F9 | 80 | 30 | B2 |
| 07C0= | 7E | 7E | 7E | 7E | FA | 07 | A8 | F8 | 0F | B8 | 08 | 52 | 95 | F3 | FA | 0F |
| 07D0= | 30 | B2 | 84 | A8 | FE | C3 | 08 | 04 | F8 | 0A | AA | B8 | 08 | A8 | 84 | FB |
| 07E0= | FC | 32 | FD | 84 | FF | 09 | 3B | FD | 1A | FF | 08 | 3B | FD | 1A | FF | 0B |

| LOC | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 07F0= | 3B | FD | 1A | FF | 04 | 3B | FD | 1A | FF | 1B | 3B | FD | 1A | E2 | C4 | 30 |
| 0800= | 01 | 8A | B8 | D8 | 30 | 1C | 92 | BF | F8 | D7 | AF | 0F | FF | 06 | 33 | 16 |
| 0810= | EC | 41 | A4 | C0 | 07 | D2 | 82 | A4 | 97 | FA | DF | B7 | 7A | E0 | 71 | 00 |
| 0820= | 85 | F6 | F6 | 85 | FA | FC | A5 | 70 | 00 | 3B | 2C | 7B | 92 | BC | F8 | DF |
| 0830= | AC | 4C | BA | 4C | AA | 4C | B8 | 4C | A8 | 52 | 8A | E2 | F7 | A8 | 98 | 52 |
| 0840= | 9A | 77 | B8 | 88 | FF | 09 | A8 | 98 | 7F | 00 | B8 | FE | 3B | 53 | 89 | F9 |
| 0850= | 10 | 30 | 56 | 89 | FA | EF | A9 | 18 | 98 | 5C | 1C | 88 | 5C | 39 | 67 | 7A |
| 0860= | 84 | FB | 3B | 32 | 13 | 30 | 16 | 84 | AA | 32 | 72 | FE | 3B | AB | FB | F8 |
| 0870= | 32 | AB | 97 | FA | 50 | 3A | AB | 8A | 3A | 84 | 94 | FB | 05 | 3A | AB | F8 |
| 0880= | FF | A4 | 30 | 89 | FB | FE | 3A | 91 | 14 | 92 | BC | F8 | EE | AC | F8 | 0D |
| 0890= | 5C | 86 | 3A | AB | 97 | FA | 0F | 3A | AB | 99 | 3A | AB | 87 | FA | 08 | 3A |
| 08A0= | AB | 94 | F6 | 32 | AB | 85 | FA | 08 | C2 | 00 | 69 | C0 | 00 | 9D | F8 | 00 |
| 08B0= | B1 | F8 | 20 | A1 | F8 | 13 | B2 | F8 | FE | A2 | F8 | 10 | BE | F8 | 04 | AE |
| 08C0= | 91 | A6 | B7 | A9 | A7 | F8 | FF | A4 | F8 | 20 | BC | F8 | 16 | AC | F8 | 2A |
| 08D0= | 5C | 80 | BA | 2A | 9A | 3A | D3 | 90 | AC | 5C | 92 | BC | BB | F8 | DF | AC |
| 08E0= | F8 | 04 | BF | F8 | F9 | AF | F8 | D3 | AB | EB | 0F | F3 | 32 | EF | 7B | 4F |
| 08F0= | 73 | FB | 7F | 3A | EA | 9B | 5C | 1C | C1 | 09 | B1 | C0 | 09 | AD | FF | FF |
| 0900= | 56 | 3E | 10 | 49 | 19 | 25 | 34 | 08 | 2A | 4D | 4F | 52 | 45 | 2A | 0D | 80 |
| 0910= | 2A | 45 | 52 | 52 | 4F | 52 | 2A | 0D | 80 | 2A | 4D | 45 | 4D | 20 | 46 | 55 |
| 0920= | 4C | 4C | 2A | 0D | 80 | 2A | 50 | 41 | 52 | 54 | 49 | 41 | 4C | 20 | 4D | 53 |
| 0930= | 47 | 2A | 0D | 80 | 2A | 4E | 4F | 20 | 49 | 44 | 53 | 2A | 0D | 80 | 2A | 4E |
| 0940= | 4F | 20 | 4D | 53 | 47 | 53 | 2A | 0D | 80 | 2A | 55 | 52 | 47 | 45 | 4E | 54 |
| 0950= | 20 | 4D | 53 | 47 | 2A | 0D | 80 | 2A | 4F | 55 | 54 | 2D | 4F | 46 | 2D | 52 |
| 0960= | 41 | 4E | 47 | 45 | 2A | 0D | 80 | 2A | 49 | 4E | 2D | 52 | 41 | 4E | 47 | 45 |
| 0970= | 2A | 0D | 80 | 2A | 4D | 53 | 47 | 20 | 4C | 4F | 53 | 54 | 2A | 0D | 80 | 2A |
| 0980= | 4D | 45 | 4D | 20 | 4C | 4F | 57 | 2A | 0D | 80 | 2A | 49 | 44 | 20 | 4D | 41 |
| 0990= | 58 | 2A | 0D | 80 | 2A | 4D | 53 | 47 | 20 | 43 | 4C | 45 | 41 | 52 | 45 | 44 |
| 09A0= | 2A | 0D | 80 | 46 | 52 | 4F | 4D | 20 | 0D | 54 | 4F | 20 | 0D | 37 | B6 | 30 |
| 09B0= | BF | 8B | 5C | F8 | 8F | 5B | F8 | C0 | 5E | 1C | 9E | 5C | 1C | 8E | 5C | 0B |
| 09C0= | FB | 8F | 3A | C7 | F8 | 40 | A9 | 19 | F8 | FF | AC | EC | 91 | 73 | 8C | FB |
| 09D0= | E4 | 3A | CC | F8 | F2 | AC | 90 | 73 | 73 | 73 | 73 | 91 | 73 | F8 | 03 |
| 09E0= | B9 | F8 | 20 | B6 | C0 | 00 | 69 | 92 | 60 | D0 | EC | 72 | F1 | 32 | E7 | F0 |
| 09F0= | 3A | F9 | 2C | F0 | FF | 01 | 5C | 60 | F0 | FF | 01 | 73 | F1 | 60 | 30 | E8 |
| 0A00= | C8 | 47 | 41 | 41 | 4C | 81 | FA | 81 | A0 | D2 | E8 | D2 | E8 | D2 | E8 | D2 |
| 0A10= | F1 | 00 | 19 | 29 | 3A | 4C | 51 | 62 | 78 | 85 | A4 | A4 | 24 | AC | C9 | CE |
| 0A20= | 6D | 6D | 4B | 5E | 6F | 6D | 6D | 6D | 4B | 5E | 6F | 89 | A7 | BE | C5 | F6 |
| 0A30= | FC | F6 | FC | F6 | FC | F6 | FC | 89 | A7 | BE | C5 | 08 | CC | D1 | E1 | DE |
| 0A40= | E5 | 31 | 49 | 02 | FB | 04 | C6 | 14 | D0 | 91 | A4 | D0 | 31 | 49 | 02 | FB |
| 0A50= | 04 | 32 | 4B | FB | 0B | 3A | 49 | 99 | F9 | 08 | B9 | 89 | FA | D7 | A9 | 97 |
| 0A60= | FA | EF | B7 | 92 | BC | F8 | ED | AC | 91 | 5C | 1C | 5C | 92 | BF | F8 | D5 |
| 0A70= | AF | 91 | 5F | 2F | 91 | 5F | 8F | FF | 06 | AF | 0F | FB | 8F | 3A | 74 | 14 |
| 0A80= | D0 | 92 | BC | F8 | D6 | AC | EC | 02 | FB | 0F | 3A | 9A | 84 | FB | 05 | 3A |
| 0A90= | 95 | F8 | 1C | A4 | D0 | F8 | 7F | C0 | 0B | 1B | 02 | 5C | F8 | 06 | A4 | D0 |
| 0AA0= | 02 | FB | 0F | 3A | 47 | F8 | 11 | A4 | 89 | FA | FB | A9 | FA | 02 | 3A | B6 |
| 0AB0= | 97 | FA | 20 | 3A | BE | D0 | 97 | FA | DF | B7 | 89 | FA | FD | A9 | 92 | BC |
| 0AC0= | F8 | F4 | AC | EC | 91 | 73 | 5C | D0 | C0 | 0D | 45 | 99 | FA | A0 | 32 | F7 |
| 0AD0= | FA | 20 | 3A | F7 | 97 | FA | 40 | 3A | F7 | 94 | A6 | 97 | F9 | 40 | B7 | 9E |
| 0AE0= | BB | 8E | AB | 1B | 1B | 1B | 92 | BC | F8 | EA | AC | EC | 88 | 73 | 9B | 73 |
| 0AF0= | F8 | FF | 5C | 99 | F9 | 20 | B9 | C0 | 07 | 14 | 92 | BC | F8 | D6 | AC | 30 |
| 0B00= | 01 | EC | 0C | FE | CF | 39 | 15 | F8 | FF | B3 | 89 | FA | 28 | 3A | 1C | 89 |
| 0B10= | F9 | 04 | A9 | 30 | 1C | 02 | FE | FE | FE | FE | F1 | B3 | 7A | 2C | 0C | FC |
| 0B20= | 01 | BA | 73 | FB | 06 | 32 | 59 | F8 | 01 | AA | 30 | 31 | 1A | 8C | FF | 06 |
| 0B30= | AC | E2 | 9A | 52 | 8C | F7 | AF | 9C | FF | 00 | BF | 0C | 32 | 61 | FB | 8F |
| 0B40= | 3A | 2C | 89 | FA | 08 | 3A | 81 | 84 | FB | 06 | 32 | 77 | 89 | FA | 20 | 3A |
| 0B50= | 79 | 31 | 77 | F8 | 04 | A4 | C0 | 0A | 6C | 89 | FA | 28 | C2 | 0E | 10 | 30 |

| LOC | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0B60= | D7 | 93 | EF | F3 | 5C | 3A | 2C | 7B | 0F | FB | 7F | 3A | 2C | 89 | FA | 08 |
| 0B70= | 3A | 79 | 89 | FA | 20 | 3A | B0 | 14 | D0 | 97 | FA | 20 | 3A | CF | C0 | 0E |
| 0B80= | 00 | 93 | FB | FF | 32 | D7 | 93 | 5F | FB | 7F | 3A | 77 | 8A | FB | 0D | 3A |
| 0B90= | A1 | 92 | BC | F8 | E5 | AC | 0C | F9 | D0 | 5C | 89 | F9 | 02 | A9 | C0 | 0E |
| 0BA0= | 24 | 7B | 5C | 8C | FF | 06 | AC | F8 | 8F | 5C | 89 | FA | BF | A9 | 30 | C8 |
| 0BB0= | 8A | FD | 02 | 33 | 7E | 8C | FF | 06 | AF | 9C | FF | 00 | BF | 7B | C8 | 2C |
| 0BC0= | 2F | 0F | 5C | FB | 8F | 3A | BF | 5F | 92 | BF | F8 | E0 | AF | 8C | 5F | C0 |
| 0BD0= | 0F | FC | 02 | FB | 0F | 3A | 77 | 97 | FA | 20 | 3A | E0 | 89 | F9 | 02 | A9 |
| 0BE0= | 89 | FA | 28 | 3A | 9E | C0 | 0E | 1D | 02 | FB | 0F | 3A | 77 | F8 | 08 | A4 |
| 0BF0= | D0 | 02 | FB | 0F | 3A | D7 | 30 | ED | F8 | 08 | B0 | F8 | 04 | A0 | D0 | FF |
| 0C00= | 92 | BF | F8 | D7 | AF | 97 | FA | 20 | 3A | 0E | 31 | 11 | 02 | 5F | 1F | 14 |
| 0C10= | D0 | F8 | 25 | A4 | 89 | F9 | 02 | A9 | D0 | 97 | FA | 20 | 3A | 26 | F8 | 26 |
| 0C20= | 31 | 13 | 02 | FA | 07 | 5F | 1F | 14 | D0 | 97 | FA | 20 | 3A | 0F | F8 | 27 |
| 0C30= | 31 | 13 | 02 | FE | FE | FE | FE | 5F | 14 | D0 | 97 | FA | 20 | 3A | 47 | F8 |
| 0C40= | 28 | 31 | 13 | 02 | EF | F1 | 5F | 1F | 1F | 1F | 14 | D0 | 02 | 5F | 1F | 14 |
| 0C50= | D0 | 31 | 5C | 02 | FE | FE | FE | FE | 5F | 2F | 14 | D0 | 2F | F8 | 80 | 5F |
| 0C60= | 14 | D0 | 31 | 70 | 0F | FE | 33 | 70 | 1F | EF | 02 | F1 | 5F | 1F | 14 | D0 |
| 0C70= | 91 | 5F | 1F | F8 | BC | 5F | 30 | 6D | 91 | 31 | 80 | 02 | FE | FE | FE | FE |
| 0C80= | 5F | 32 | A1 | 14 | D0 | 02 | C5 | F8 | 00 | EF | F1 | 5F | E2 | FA | F0 | FB |
| 0C90= | 10 | 32 | A1 | 96 | F9 | 80 | B6 | 0F | F6 | F6 | F6 | F6 | 52 | 84 | F7 | A4 |
| 0CA0= | D0 | 10 | 10 | D0 | 92 | BC | F8 | E1 | AC | 4C | BA | 0C | AA | 1A | 1A | F8 |
| 0CB0= | D6 | AC | 84 | FB | 1B | C2 | 0D | 26 | 85 | FE | 95 | FA | 7F | C7 | F8 | 7F |
| 0CC0= | B3 | 97 | FA | 20 | 32 | CF | 95 | 0F | F3 | 32 | D1 | 93 | FB | 7F | CE | 93 |
| 0CD0= | 5F | 0F | FB | 7F | 3A | DA | 0A | F9 | 04 | 5A | EC | F8 | 08 | A0 | 0F | 52 |
| 0CE0= | 02 | FE | C7 | FB | 06 | FC | 00 | 52 | 20 | 80 | 3A | E0 | 02 | F6 | F3 | 5C |
| 0CF0= | F8 | 04 | A0 | F8 | DA | AC | 4C | BA | 0C | C0 | 0D | 08 | FF | FF | FF | FF |
| 0D00= | 57 | 67 | 73 | 7F | 8A | 94 | A1 | A1 | AA | 2A | 9A | 52 | 8A | E2 | F1 | 32 |
| 0D10= | 18 | 8A | 5C | 2C | 9A | 5C | 1F | D0 | 0F | FB | 0D | 32 | 20 | F8 | 0D | 5F |
| 0D20= | 1F | F8 | C0 | 5F | 14 | D0 | 85 | FE | 33 | 32 | 95 | FA | 7F | 52 | 0C | F3 |
| 0D30= | 32 | 39 | 0A | F9 | 04 | 5A | C0 | 0E | 24 | 97 | FA | DF | B7 | F8 | FC | A4 |
| 0D40= | 0A | FA | FB | 5A | D0 | 7B | 92 | BA | F8 | E5 | AA | 89 | FA | 02 | 3A | A6 |
| 0D50= | 92 | BC | F8 | E1 | AC | 4C | BF | 0C | AF | 0F | FA | BF | 5F | 1F | 1F | 1F |
| 0D60= | 0F | FE | 33 | 6E | FB | FE | 3A | 6B | F8 | 2A | 5F | 1F | 30 | 60 | 8F | 5C |
| 0D70= | 2C | 9F | 5C | 89 | FA | FB | A9 | 87 | FA | 1B | A7 | 99 | FA | 18 | F9 | 43 |
| 0D80= | B9 | 96 | F9 | 20 | B6 | FA | 02 | 32 | 96 | 89 | FA | 02 | 3A | 92 | 99 | F9 |
| 0D90= | 80 | B9 | 87 | F9 | 04 | A7 | 0A | FA | 3C | 5A | 89 | FA | 02 | C2 | 0E | 00 |
| 0DA0= | 89 | FA | FD | A9 | 30 | C6 | 0A | F9 | C4 | 5A | 30 | 73 | 31 | CE | 02 | AC |
| 0DB0= | FA | 07 | 52 | 8C | FA | 08 | C2 | 0E | 54 | 89 | FA | 04 | 3A | C2 | F8 | 20 |
| 0DC0= | A4 | D0 | 89 | FA | FB | A9 | 82 | A4 | D0 | 31 | CE | C0 | 0E | 67 | C1 | 0E |
| 0DD0= | 10 | C0 | 0E | 78 | 2F | 4F | FA | 07 | F6 | BC | 0F | 76 | AC | 9C | F6 | BC |
| 0DE0= | 8C | 76 | AC | 89 | F9 | 80 | A9 | F8 | FF | A4 | 9C | 3A | EE | 1C | 92 | BF |
| 0DF0= | F8 | ED | AF | 9C | 5F | 1F | 8C | 5F | D0 | FF | FF | FF | FF | FF | FF | FF |
| 0E00= | F8 | DC | AF | 92 | BF | 4F | BC | 0F | AC | C0 | 0D | E7 | F8 | DA | 30 | 02 |
| 0E10= | 91 | BC | F8 | BC | AC | 97 | F9 | 10 | B7 | 91 | C0 | 0D | E9 | 7B | 91 | BC |
| 0E20= | F8 | BC | AC | 38 | 7A | 92 | BF | F8 | DC | AF | 4F | 31 | 30 | BC | 0F | AC |
| 0E30= | EF | 94 | 73 | 91 | 5F | 97 | F9 | 20 | B7 | 87 | FA | E7 | A7 | F8 | F3 | AF |
| 0E40= | 9C | C6 | 1C | 9C | 5F | 1F | 8C | 5F | 82 | A4 | D0 | 39 | 54 | 84 | FB | 22 |
| 0E50= | 32 | 48 | 30 | 1D | 92 | BF | F8 | DC | AF | 02 | 5F | 1F | 14 | D0 | 39 | 67 |
| 0E60= | 84 | FB | 23 | 32 | 48 | 30 | 1D | 02 | FE | FE | FE | 5F | 14 | D0 | 39 |
| 0E70= | 78 | 84 | FB | 24 | 32 | 48 | 30 | 1D | EF | 02 | F1 | 5F | 84 | FB | 24 | 32 |
| 0E80= | 00 | 84 | FB | 2A | 32 | 24 | C0 | 0D | D4 | 92 | BF | F8 | DA | AF | 96 | FA |
| 0E90= | BF | B6 | 39 | 9F | 84 | FB | 2B | 3A | 48 | 96 | F9 | 40 | B6 | 14 | D0 | 02 |
| 0EA0= | FE | FE | FE | FE | 5F | 14 | D0 | 39 | AE | 84 | FB | 2C | 30 | 97 | E2 | 0F |
| 0EB0= | F1 | 5F | 1F | 84 | FB | 36 | 3A | A5 | 96 | F9 | 10 | B6 | 30 | 00 | 39 | 9F |
| 0EC0= | 84 | FB | 2D | 30 | 97 | 39 | CE | 84 | FB | 2E | 3A | 48 | 30 | EB | 0F | F1 |

```
LOC   0  1  2  3  4  5  6 . 7  8  9  A  B  C  D  E  F
0ED0=5F 84 FB 3A 32 0C 96 FA 40 3A E8 92 BC F8 F2 AC
0EE0=EC 0F 73 2F 0F BA 73 8A 73 9A 73 F8 10 BF 91 AF
0EF0=96 FA EF B6 14 D0 02 FA 07 39 A0 C8 39 AE 30 00
0F00=80 10 20 02 40 04 08 01 7A 91 A0 92 BC BA F8 DE
0F10=AA 0A FA 01 32 17 7B 0A FA 0F 52 96 FA 10 F6 F6
0F20=F6 F6 F1 B0 F8 D8 AA 89 FA 10 3A BE F8 E3 AC 4C
0F30=52 0C AC 02 BC 52 4A F7 3B 55 3A 44 8C 52 0A F7
0F40=3B 55 32 55 90 FA 08 32 61 92 BC F8 E1 AC F8 10
0F50=5C 1C F8 04 5C 0A AC 52 2A 0A BC F1 3A 64 1C 30
0F60=64 F8 24 A0 F8 DA AA 9C 5A 1A 8C 5A F8 D6 AA 91
0F70=5A 1C 1C 1C 31 7F 96 FA 10 32 7F 1C 1C 1C 1C F8
0F80=E1 AA 4A BF 0A AF 90 FA 07 FE FE FE F9 C0 52 9C
0F90=F1 5F 1F 8C 5F 1F 90 FA 08 F9 80 52 80 F1 5F 1F
0FA0=31 B8 96 FA 10 32 B8 F8 10 BC 91 AC 4C 5F 1F 4C
0FB0=5F 1F 4C 5F 1F 4C 5F 1F F8 1A A4 C0 0B F8 1A 90
0FC0=FA 08 3A 49 89 F9 02 A9 F8 FC 30 BA 89 F9 20 30
0FD0=DA 89 FA 10 CA 0B D7 89 F9 08 A9 C0 0B 53 F8 2B
0FE0=C8 F8 37 A4 D0 7B 92 BA BC F8 CE AA 0A FB 8F 32
0FF0=FC F8 E0 AC 8A FF 06 AA 5C F8 8F 5A F8 3B A4 D0
```

What is claimed is:

1. A message communication system with message storage comprising:

transmitting means for developing and transmitting a binary encoded data train which has a message portion and a header preceeding said message portion, said message portion including a plurality of characters, said header including, in the order stated, a plurality of synch signals, a first control signal following said synch signals to mark the end of said plurality of said synch signals, a selected number of address signals, said first control signal being further interposed between each of said selected number of address signals in the event said header includes more than one of said selected number of address signals, a second control signal to mark the end of said selected number of address signals, and a message length signal which includes information of a total character count of said plurality of characters; and a plurality of personal receivers, each of said personal receivers including synch means responsive to said synch signals and operative to prepare each of said personal receivers for reception of said data train, address means responsive to said address signals for addressing one or more of said personal receivers for which said message portion is intended defining an addressed personal receiver, said address means including first address means responsive to a universal address signal common to all of said personal receivers, second address means responsive to an individual address signal unique to a different one of each of said personal receivers, and third address means responsive to a selected address signal common to a selected group of said personal receivers, and message means for receiving and storing in said address personal receiver said message portion and selectively displaying said message portion in alphanumeric characters, said message means including a plurality of character storage locations, said message means in response to said message length signal further being for reserving a selected number of said character stored locations in said address personal receiver commensurate with said total character of said plurality of characters.

2. A message communication system with message storage in accordance with claim 1 in which said third address means is programmable by said message portion.

3. A message communication system with message stored in accordance with claim 2 in which said header further includes a command signal containing selected instructions for said addressed personal receiver relative to the utilization of said message portion, and in which each of said personal receivers further includes command means responsive to said command signal and operative to utilize said message portion in accordance with said selected instructions set forth in said command signal.

4. A message communication system with message storage in accordance with claim 3 in which one of said instructions contained in said command signal is to store said message portion and in which said command means, in response to said one of said instructions, stores said message portion in said message means.

5. A message communication system with message storage in accordance with claim 3 in which one of said instructions in said command signal is to delete an address corresponding to a selected one of said address signals from a selected one of said address means, and in which said command means, in response to such instructions, makes said selected one of said address means nonresponsive to said selected one of said address signals.

6. A message communication system with message storage in accordance with claim 3 in which one of said instructions in said command signal is to write an address corresponding to a selected one of said address signals into a selected one of said address means, and in which said command means, in response to such instructions, makes said selected one of said address means responsive to said selected one of said address signals.

7. A message communication system with message storage in accordance with claim 4 in which said command signal is disposed prior to said message length signal.

8. A message communication system with message storage in accordance with claim 5 in which the address from all address means other than said first address means is deletable.

9. A message communication system with message storage comprising:
  transmitting means for developing and transmitting a binary encoded data train which has a message portion and a header preceding said message portion, said header including, in the order stated, a plurality of synch signals, a first control signal following said synch signals to mark the end of said plurality of synch signals, a selected number of address signals, said first control signal being further interposed between each of said selected number of address signals in the event such header includes more than one of said select number of address signals, a second control signal to mark the end of said selected number of address signals, and a message length signal which includes information of a total character count of said message portion; and
  a plurality of personal receivers, each of said personal receivers including reception duty cycle means for sequentially activating each of said receivers for a first time period and deactivating each of said receivers for a second time period, each sequential occurrence of said first and said second time period defining a duty cycle, said plurality of said synch signals extending for a time period which is in excess of said second time period, synch means responsive to said synch signals and operative to prepare each of said personal receivers for reception of said data train, address means responsive to said address signals for addressing one or more of said personal receivers for which said message portion is intended defining an addressed personal receiver, said address means including first address means responsive to a universal address signal common to all of said personal receivers and second address means responsive to an individual address signal unique to a different one of each of said personal receivers, and message means for receiving and storing in said address personal receiver said message portion and selectively displaying said message portion in alphanumeric characters, said first time period being variably extended after reception of said synch signals.

10. A message communication system with message storage in accordance with claim 9 in which said header further includes a drift signal containing information of the time remaining until the end of said data train and, in the event of the repeated transmission of said data train, the end of the last data train, and in which said receiver further includes control means responsive to said drift signal and operative to change the time period of at least one of said first time period and said second time period.

11. A message communication system with message storage in accordance with claim 10 in which said first time period is extended in accordance with said drift signal until receipt of an acceptable data train is verified.

12. A message communication system with message storage in accordance with claim 11 in which said drift signal is disposed following said message length signal.

13. A message communication system with message storage in accordance with claim 10 in which said header further includes a command signal containing selected instructions for the addressed personal receiver relative to the utilization of the message portion, and in which said personal receiver further includes a command means responsive to said command signal and operative to utilize said message portion in accordance with the instructions set forth in said command signal.

14. A message communication system with message storage in accordance with claim 13 in which one of said instructions contained in said command signal is to change the duration of said time periods, and in which said command means, in response to such instructions, changes a selected time period in accordance with such instructions.

15. A message communication system with message storage in accordance with claim 14 in which said command signal is disposed prior to said message length signal.

16. A message communication system with message storage in accordance with claim 13 in which said control means is further responsive to said synch signals and operative to extend said first time period as long as it receives synch signals for the reception of at least said first control signal.

17. A message communication system with message storage in accordance with claim 16 in which said control means is further responsive to said first control signal and operative to extend said first time period at least until it either receives an address signal to which an address means is responsive or said second control signal.

18. A message communication system with message storage in accordance with claim 17 in which said first time period is extended for reception of the drift signals in said header in the event of an absence of an address signal to which an address means is responsive.

19. A message communication system with message storage in accordance with claim 18 in which said control means is further responsive to said drift signal and operative to terminate said first time period and extend said second time period for a time commensurate with said drift signal.

20. A message communication system with message storage in accordance with claim 17 in which said first time period is extended for reception of at least the message portion in response to the reception of an address signal to which an address means is responsive.

21. A message communication system with message storage in accordance with claim 20 in which said control means is further responsive to said message length signal and operative to terminate said first time period after reception of the message portion.

22. A message communication system with message storage in accordance with claim 13 further including a parity check signal disposed at the end of the message portion of said data train, said parity check signal including information for determining the absence or presence of errors in the message portion as received by an address personal receiver.

23. A message communication system with message storage in accordance with claim 22 in which said control means is responsive to said parity check signal and operative to modify the time periods in accordance with the information derived from said parity check signal.

24. A message communication system with message storage in accordance with claim 23 in which said first time period is terminated in response to a parity check signal indicating the reception of an error free message portion.

25. A message communication system with message storage in accordance with claim 24 in which said second time period is extended in the event the information contained in said drift signal indicates time remaining until the end of said data train, and in the event of said repeated transmission of said data train, the end of said last data train.

26. A message communication system with message storage in accordance with claim 23 in which said first time period is extended in response to a parity check signal indicating the reception of an error containing message portion.

27. A message communication system with message storage in accordance with claim 26 in which said first time period is extended in the event the information contained in said drift signal indicates time remaining until the end of said data train, and in the event of said repeated transmission of said data train, the end of said last data train.

28. A message communication system with message storage in accordance with claim 13 in which said message length signal further includes information concerning the presence of an immediately following data train, and in which said control means is further responsive to said message length signal and operative to extend said first time period to assure reception of said immediately following data train.

29. A message communication system with message storage in accordance with claim 13 in which each of said personal receivers further includes out of range warning means for developing and displaying a warning message in one of said personal receivers when said one of said personal receivers is out of the range of said transmitting means, said out of range warning means including a timer which is decremented once during each occurrence of said duty cycle from an initial value, said initial value being restored only in the event of the reception of said plurality of synch signals, said warning message being developed and displayed when said timer is decremented to a predetermined value.

30. A message communication system with message storage in accordance with claim 29 in which said out of range warning means is responsive to said synch signals and operative to increment said timer to said initial value.

31. A message communication system with message storage in accordance with claims 30 in which one of said instructions contained in said command signal is to change the value of said timer in accordance with the message portion of said data train, and in which said command means is responsive to such instructions and operative to change the value of said timer in accordance with such instructions.

32. A message communication system with message storage in accordance with claim 9 in which each of said personal receiver further includes third address means responsive to a selected address signal common to a selected group of said personal receivers, said third address means being programmable by said message portion.

33. A message communication system with message storage in accordance with claim 32 in which said header further includes a command signal containing selected instructions for said addressed personal receiver relative to the utilization of said message portion, and in which each of said personal receivers further includes command means responsive to said command signal and operative to utilize said message portion in accordance with said selected instruction set forth in said command signal.

34. A message communication system with message storage in accordance with claim 15 in which said command signal is disposed prior to said message length signal.

35. A message communication system with message storage in accordance with claim 32 in which said header further includes a drift signal containing information of the time remaining until the end of said data train and, in the event of the repeated transmission of said data train, the end of the last data train, and in which said receiver further includes control means responsive to said drift signal and operative to change the time period of at least one of said first time period and said second time period.

36. A message communication system with message storage in accordance with claim 35 in which said drift signal is disposed following said message length signal.

37. A message communication system with message storage in accordance with claim 35 in which said header further includes a length of remaining header signal containing information of further signals preceeding said message portion, and in which said personal receiver further includes control means responsive to said length of remaining header signal and operative to modify the time periods in accordance with the information derived from said length of remaining header signal.

38. A message communication system with message storage in accordance with claim 37 in which said length of remaining header signal is disposed following said message length signal.

39. A message communication system with message storage in accordance with claim 32 in which said header further includes a format signal containing information on selected prestored messages contained in each of said personal receivers, and in which each of said personal receivers further includes formating means responsive to said format signal and operative to develop and display said prestored messages accompanying said message portion received in said addressed personal receiver.

40. A message communication system with message storage in accordance with claim 39 in which said format signal is disposed following said message length signal.

41. A message communication system with message storage in accordance with claim 32 in which said header further includes a command signal for performing one or more selected functions in the addressed personal receiver, said command signal disposed between said second control signal and said message length signal, a drift signal which includes information of the time remaining until the end of said data train and, in the event of the repeated transmission of said data trains, the end of the last data train, said drift signal disposed following said message length signal, a length of remaining header signal for providing information of further signals preceding the start of said message portion, said length of remaining header signal disposed following said drift signal, and a format signal containing information on selected parts of said message portion, said format signal disposed following said length of remaining header signal.

42. A message communication system with message storage in accordance with claim 41 in which all signals of said header have a length of one or more bytes.

43. A message communication system with message storage in accordance with claim 42 in which each byte is divided into a correction portion nibble and information portion nibble.

44. A message communication system with message storage in accordance with claim 43 in which said address signals have a plurality of bytes.

45. A message communication system with message storage in accordance with claim 44 in which said address signals have at least eight bytes.

46. A message communication system with message storage in accordance with claim 43 in which said drift signal has a plurality of bytes.

47. A message communication system with message storage in accordance with claim 46 in which said drift signal has at least three bytes.

48. A message communication system with message storage in accordance with claim 43 in which said second control signal has a plurality of bytes.

49. A message communication system with message storage in accordance with claim 48 in which said second control signal has at least two bytes.

50. A message communication system with message storage in accordance with claim 43 in which said message length signal has a plurality of bytes.

51. A message communication system with message storage in accordance with claim 50 in which said message length signal has at least three bytes.

* * * * *